United States Patent [19]

Kondou et al.

[11] Patent Number: 5,437,817

[45] Date of Patent: Aug. 1, 1995

[54] LIQUID CRYSTALLINE ORGANOPOLYSILOXANES AND LIQUID CRYSTAL COMPOSITIONS

[75] Inventors: Takashi Kondou, Anna; Masaaki Yamaya, Annaka; Hiroshi Yoshioka, Tokyo; Yasuhiro Ohtsuka; Kazuo Tojima, both of Toyota; Yasufumi Shibata, Anjo; Naomi Ohkuwa, Aichi; Shinobu Okayama, Toyota, all of Japan

[73] Assignees: Shin-Etsu Chemical Company, Limited, Tokyo; Toyota Jidosha Kabushiki Kaisha, Aichi, both of Japan

[21] Appl. No.: 800,004

[22] Filed: Nov. 27, 1991

[30] Foreign Application Priority Data

Nov. 30, 1990 [JP]  Japan .................... 2-339912
Mar. 22, 1991 [JP]  Japan .................... 3-059209
May 27, 1991 [JP]  Japan .................... 3-121329

[51] Int. Cl.⁶ .................... C09K 19/20; C09K 19/52; C07F 7/04
[52] U.S. Cl. .................... 252/299.67; 252/299.01; 252/299.6; 252/299.61; 252/299.62; 252/299.68; 556/434; 556/439; 556/453; 556/454; 556/457; 528/25; 528/26; 528/43
[58] Field of Search .......... 252/299.01, 299.6, 299.67, 252/299.68, 299.62; 556/439, 453, 454, 457, 434; 528/25, 26, 43

[56] References Cited

U.S. PATENT DOCUMENTS

| | | | |
|---|---|---|---|
| 4,316,041 | 2/1982 | Totten et al. | 556/420 |
| 4,774,028 | 9/1988 | Imai et al. | 260/397.2 |
| 4,904,066 | 2/1990 | Gray et al. | 359/103 X |
| 4,983,318 | 1/1991 | Matsumoto et al. | 252/299.01 |
| 5,106,530 | 4/1992 | Haas et al. | 252/299.6 |
| 5,138,010 | 8/1992 | Keller et al. | 528/26 |

FOREIGN PATENT DOCUMENTS

| | | |
|---|---|---|
| 0260687 | 3/1988 | European Pat. Off. |
| 0260786 | 3/1988 | European Pat. Off. |
| 0333022 | 9/1989 | European Pat. Off. |
| 0344779 | 12/1989 | European Pat. Off. |
| 2638164 | 4/1990 | France |
| 3172787 | 7/1988 | Japan |
| 4001762 | 1/1989 | Japan |

OTHER PUBLICATIONS

Makromolekulare Chemie, Macromolecular Chemistry and Physics; vol. 187; No. 12, 1986; pp. 2909–2931; Allen et al.; "Synthesis and characterization of Poly(dimethylsiloxane) based liquid crystals".

*Primary Examiner*—Robert L. Stoll
*Assistant Examiner*—C. Harris
*Attorney, Agent, or Firm*—Birch, Stewart, Kolasch & Birch

[57] ABSTRACT

Liquid crystalline organopolysiloxane is provided having the general formula:

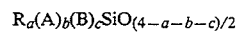

$$R_a(A)_b(B)_c SiO_{(4-a-b-c)/2}$$

wherein R is independently selected from the group consisting of a hydrogen atom, hydrocarbon group having 1 to 4 carbon atoms, and phenyl group, A is a group of the formula:

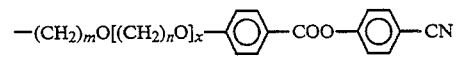

$$-(CH_2)_m O[(CH_2)_n O]_x -\!\!\bigcirc\!\!-COO-\!\!\bigcirc\!\!-CN$$

wherein m, n, and x are integers in the range: $m \geq 3$, $n \geq 2$, $5 \leq m + nx \leq 15$, $x = 1$ or 2, B is an organic chromophore group having an absorption peak in the visible spectrum, a, b, and c are numbers in the range: $1 \leq a < 2$, $0 < b + c \leq 1$, $0.45 \leq b/(b+c) \leq 0.95$, and $1 < a + b + c \leq 3$. This organopolysiloxane as a high molecular weight liquid crystal is combined with a low molecular weight liquid crystal to form a liquid crystal composition.

25 Claims, 5 Drawing Sheets

LIQUID CRYSTALLINE ORGANOPOLYSILOXANES AND LIQUID CRYSTAL COMPOSITIONS

This invention relates to liquid crystalline organopolysiloxanes and more particularly, to liquid crystalline organopolysiloxanes having a wide effective temperature range as liquid crystal, capable of reversibly altering light transmittance in the visible light spectrum, possessing electrical memory ability, and thus finding use as lighting control glass, recording material or the like. It also relates to liquid crystal compositions comprising the same as a high molecular weight liquid crystal.

BACKGROUND OF THE INVENTION

Liquid crystals are generally classified into low and high molecular weight liquid crystals. The low molecular weight liquid crystals characterized by very quick response are currently used in display elements or the like, but are difficult to form large surface area elements because of processing difficulty.

On the other hand, the high molecular weight liquid crystals include high molecular weight compounds having a mesogen group bonded to their backbone and compounds having a mesogen group grafted to a side chain, and the latter side chain type compounds are known to have useful characteristics as display elements. These compounds having a mesogen group on a side chain can have a backbone selected from a variety of chains while compounds having a siloxane backbone have superior temperature properties and weather resistance among others. For example, Japanese Patent Application Kokai No. 234086/1988 discloses thermally stable, weather resistant siloxane compounds which can be manufactured in film or sheet form having a large surface area.

Siloxane type liquid crystalline compounds, however, have the drawback of low response speed though acceptable for use as lighting control glass or the like. This is because these high molecular weight liquid crystals are too viscous at room temperature to drive by the conventional liquid crystal cell driving method. Therefore, these liquid crystals must be placed in a constant temperature tank or heated by a dryer or heater before they can be driven.

Further, dye-modified liquid crystals having polyacrylate and polymethacrylate backbones are known from European Patent No. 90282. Liquid crystalline copolymers having a siloxane backbone are also known from Japanese Patent Application Kokai No. 77910/1988 disclosing liquid crystalline copolymers containing an anthraquinone dye. Although the liquid crystalline copolymers are described as useful in information storage, no reference is made to a mechanism or process of recording information or providing memory. The only description found therein is that the liquid crystalline copolymers are colored with the dyes and effective as auxiliary substances for dissolving dyes in a guest-host manner.

Additionally, Japanese Patent Application Kokai No. 282269/1989 discloses silicone liquid crystals containing azo dyes while a mesogen group is not specified. A general description indicating the potential use as information recording material is found, but memory ability is referred to nowhere in Examples and the specification. Dyes are described as simply imparting color.

In summary, no references have specifically described the memory ability of liquid crystal.

SUMMARY OF THE INVENTION

Therefore, an object of the present invention is to provide a liquid crystalline organopolysiloxane having a specific combination of a mesogen structure and a dye modifying group or chromophore group, featuring a wide, practical effective temperature range as liquid crystal, reversible alteration of light transmittance in the visible light spectrum, and electrical memory ability.

Another object of the present invention is to provide a liquid crystal composition having a wide, practical effective temperature range as liquid crystal, capable of reversibly altering light transmittance in the visible light spectrum, and possessing a light transmittance memory ability.

In one form of the present invention for achieving the above and other objects, there is provided a liquid crystalline organopolysiloxane having the general formula (I).

$$R_a(A)_b(B)_c SiO_{(4-a-b-c)/2} \quad (I)$$

In formula (I), R is independently selected from the group consisting of a hydrogen atom, hydrocarbon group having 1 to 4 carbon atoms, and phenyl group. A is a group of the formula (II):

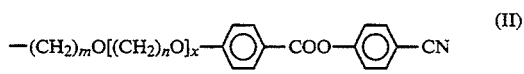

$$-(CH_2)_m O[(CH_2)_n O]_x -\!\!\bigcirc\!\!- COO -\!\!\bigcirc\!\!- CN \quad (II)$$

wherein m, n, and x are integers in the range: $m \geq 3$, $n \geq 2$, $5 \leq m+nx \leq 15$, $x = 1$ or 2. B is an organic chromophore group having an absorption peak in the visible spectrum. Letters a, b, and c are numbers meeting the requirement: $1 \leq a < 2$, $0 < b+c \leq 1$, $0.45 \leq b/(b+c) \leq 0.95$ and $1 < a+b+c \leq 3$.

The liquid crystalline organopolysiloxane of formula (I) has a wide, practical effective temperature range as liquid crystal and electrical memory ability and can be processed to have a large surface area. The other feature of coloring or tinting permits one to visually distinguish the difference of orientation of liquid crystal without a need for a polarizing plate, with the benefit of possible manufacture of display elements. The compounds of the invention thus find a wide variety of applications such as lighting control glass and recording material.

In another form, the present invention provides a liquid crystal composition comprising an organopolysiloxane of formula (I). In one preferred embodiment, the liquid crystal composition comprises 35 to 80 parts by weight of the organopolysiloxane of formula (I) as a high molecular weight liquid crystal and 65 to 20 parts by weight of a low molecular weight liquid crystal.

The inventors have discovered the interesting phenomenon that this liquid crystal composition becomes transparent when AC voltage, often of 50 to 300 V, preferably of 100 to 250 V, often at a frequency of 20 to 500 Hz, preferably 50 to 400 Hz is applied thereto, but becomes scattering or opaque and colored when DC voltage, often of 50 to 300 V, preferably of 100 to 250 V or low frequency AC voltage, often of 50 to 300 V, preferably of 100 to 200 V at a frequency of up to 20 Hz, preferably 0.01 to 1.0 Hz is applied thereto. Therefore, the present liquid crystal composition provides for practical performance of reversibly altering light transmittance in the visible light spectrum.

Due to the inclusion of high and low molecular weight liquid crystals and an optional dye, the present liquid crystal composition provides a low viscous liquid crystal as a whole and is considered to be a molecular level mixture, offering a wide useful temperature range, adequate viscosity, and high memory ability. The composition allows for switch drive because it can be turned transparent by applying AC voltage and scattering by applying DC voltage, both in a reversible manner at room temperature. Increased surface area elements are achievable because the composition is advantageous to operate without a need for an orienting agent. Display elements can be manufactured due to the additional benefit of coloring which permits one to visually distinguish the difference of orientation of liquid crystal without a need for a polarizing plate.

In a further preferred embodiment of the present invention, the liquid crystal composition further contains 0.01 to 0.5% by weight of an organic electrolyte material based on the total weight of the organopolysiloxane of formula (I) or high molecular weight liquid crystal and the low molecular weight liquid crystal. An interesting phenomenon occurs in this liquid crystal composition that it becomes transparent when AC voltage, often of 50 to 300 V, preferably of 100 to 250 V, often at a frequency of at least 600 Hz, preferably 1 to 5 kHz is applied thereto, but becomes scattering or opaque and colored when DC voltage, often of 50 to 300 V, preferably of 100 to 250 V or low frequency AC voltage, often of 50 to 300 V, preferably of 100 to 200 V at a frequency of up to 30 Hz, preferably 0.01 to 10 Hz is applied thereto.

Due to the inclusion of an organic electrolyte in a high and low molecular weight liquid crystal mix, this liquid crystal composition significantly shortens the response time of display elements upon application of DC voltage as compared with organic electrolyte-free compositions. Some organic electrolytes can shorten the response time of display elements upon application of AC voltage.

Therefore, the liquid crystal compositions of the present invention can be widely used as lighting control glass in housing applications as well as automobile applications. The liquid crystal compositions can also be used as recording material.

DETAILED DESCRIPTION OF THE INVENTION

Figure 1:
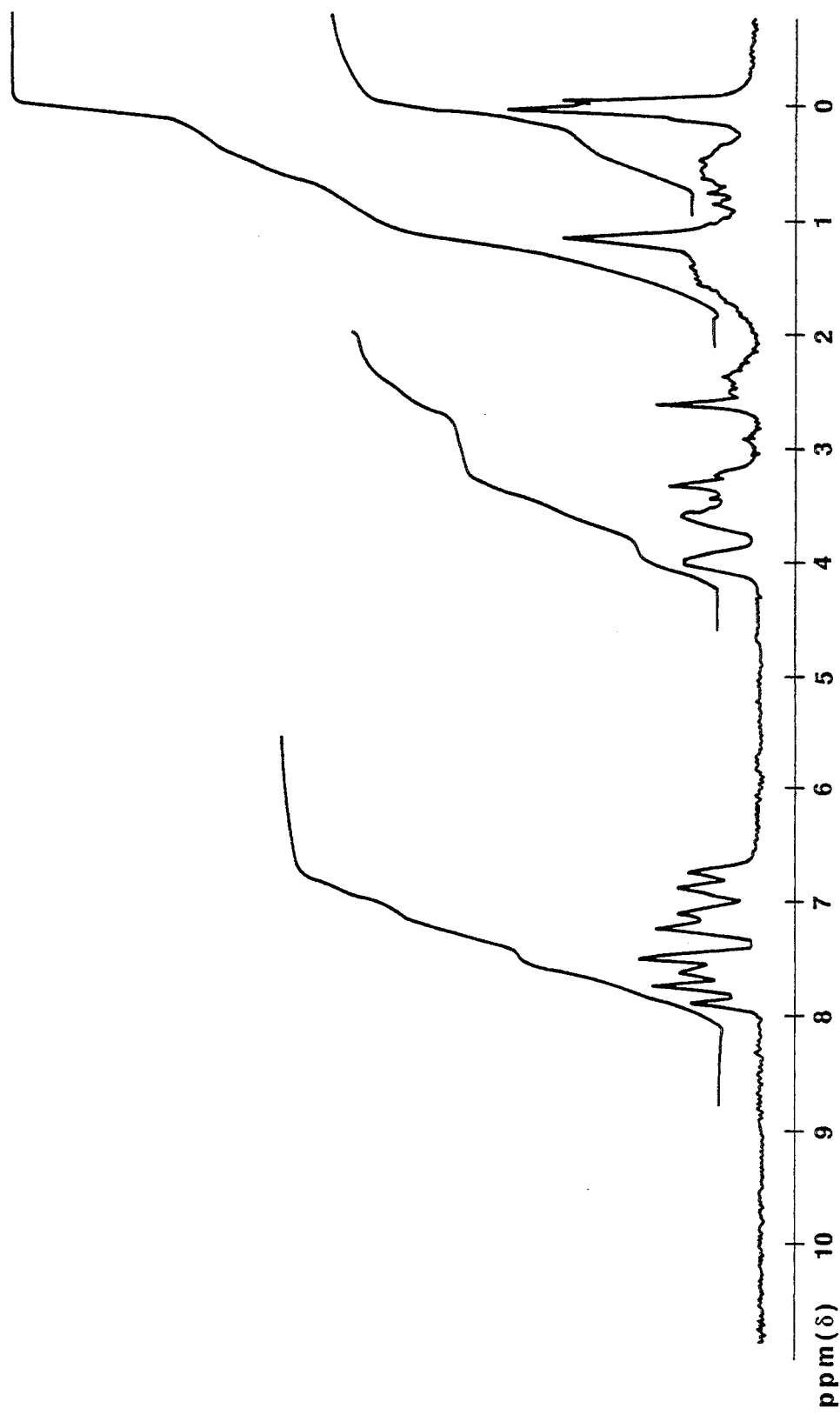
FIG. 1 is a proton NMR spectrum of the organopolysiloxane obtained in Example 1.

The liquid crystalline organopolysiloxanes of the invention are represented by the general formula (I).

$$R_a(A)_b(B)_c SiO_{(4-a-b-c)/2} \quad (I)$$

In formula (I), R, which may be identical or different groups, is independently selected from the group consisting of a hydrogen atom, hydrocarbon group having 1 to 4 carbon atoms, and phenyl group, for example, —H, —CH$_3$, —CH$_2$ CH$_3$, and

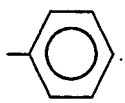

A is a group of the formula (II):

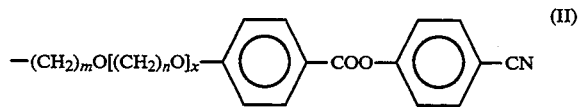

wherein m, n, and x are integers in the range: m≧3, n≧2, 5≦m+nx≦15, x=1 or 2. Examples of the formula (II) group are given below.

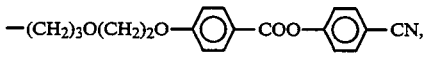

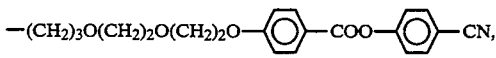

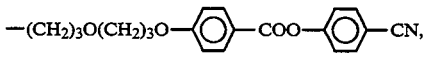

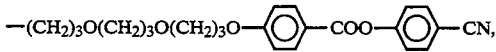

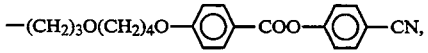

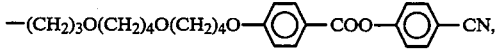

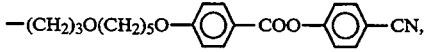

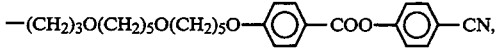

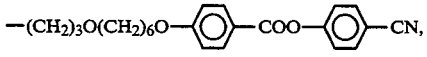

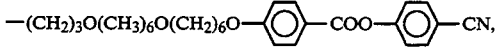

-continued

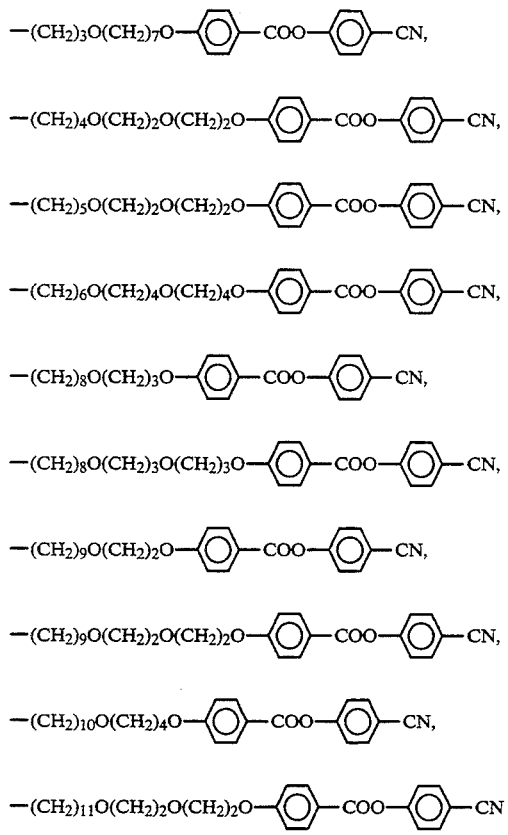

As seen from formula (II), component A consists essentially of a mesogen group and a spacer for attaching the mesogen group to the siloxane backbone. When the mesogen group is oriented under the impetus of an external electric or magnetic field, the spacer represented by $-(CH_2)_mO[(CH_2)_nO]_x-$ has a significant influence on the orientation, orientation maintenance or memory ability, and useful temperature range. The length of the spacer meets the requirement: $m \geq 3$, $n < 2$, $5 \leq \leq m+nx \leq 15$, and $x=1$ or 2. If $m<3$, $n<2$ or $m+nx<5$, then the mesogen group is so intensely bound by the siloxane backbone as to alter the orientation as liquid crystal. If $m+nx>15$, increased softness would rather disturb regular orientation. For component A of formula (II), a balance of binding and softness is a key for affording orientation, memory ability, and a wide useful temperature range as liquid crystal.

Moreover, component A contains an ether bond in the spacer moiety, which allows for electrical memory and other liquid crystalline properties.

In formula (I), B is an organic chromophore group having an absorption peak in the visible spectrum, for example, a group of the formula (II) having an azo or anthraquinone group.

$$-F-Z \quad (III)$$

In formula (III), F is a linear or branched alkylene group having 1 to 12 carbon atoms, which may contain $-O-$, $-COO-$ or $-OCO-$ in the chain. Preferably, F is a group: $-X-COO-$ wherein X is an alkylene group having 3 to 10 carbon atoms. Z is an organic group containing an azo or anthraquinone group having an absorption peak in the visible spectrum, that is, a chromophore moiety containing an azo or anthraquinone group.

B is selected from the following exemplary chemical formulae where the chromophore moiety in the formula (III) group is an azo-containing one.

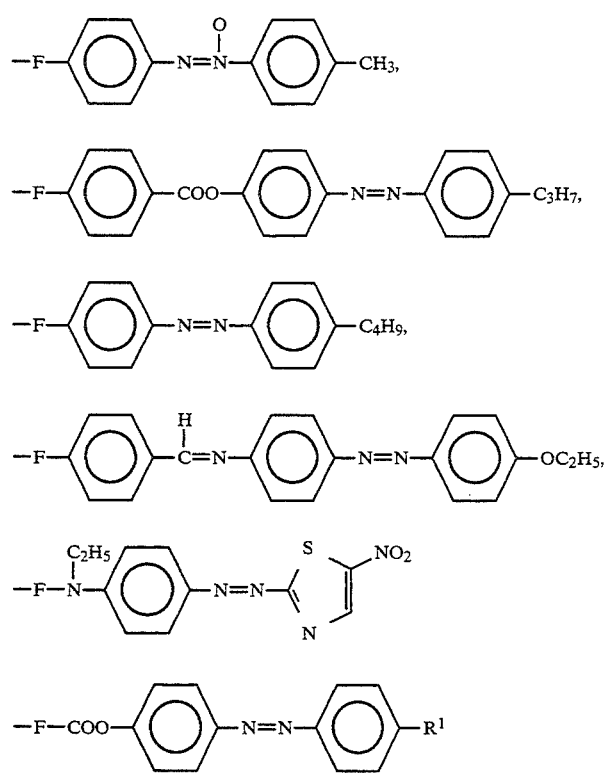

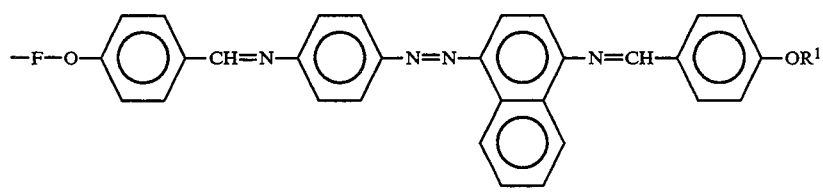
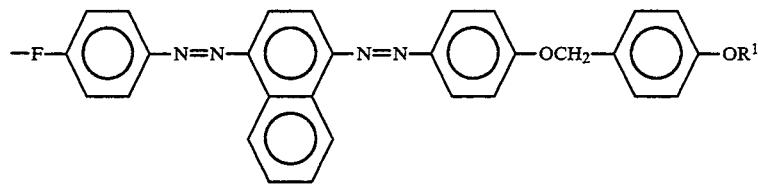
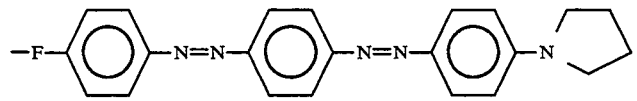
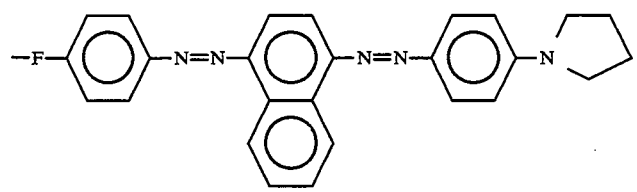
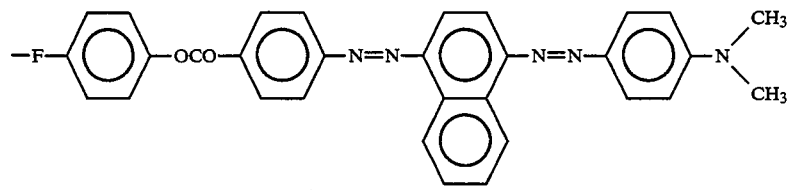
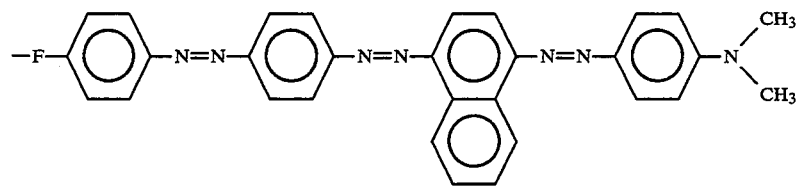
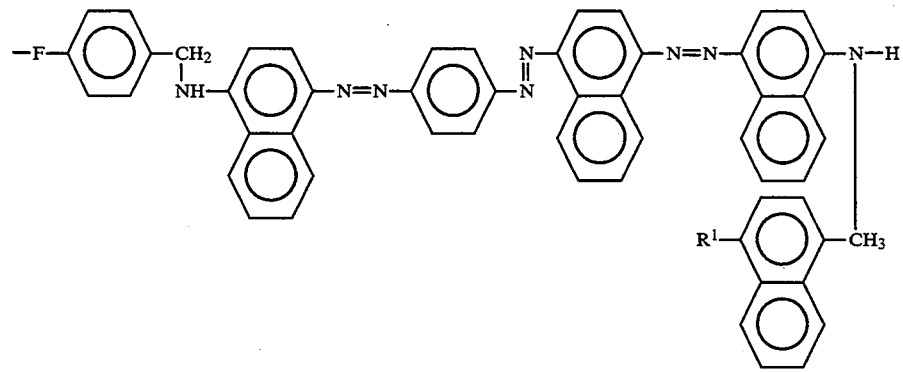
In the formulae, F is as defined above and $R^1$ is an alkyl group having 1 to 8 carbon atoms.
Preferred azo-containing chromophore groups B are of the formula (IIIa):
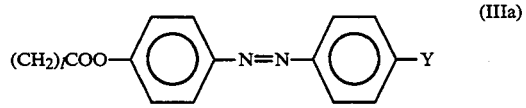
(IIIa)

wherein Y is a hydrogen atom or a monovalent hydrocarbon group having 1 to 4 carbon atoms, and l is an integer of from 3 to 10. Their examples are given below.
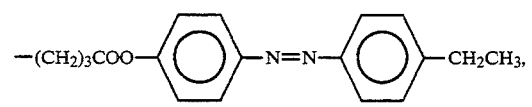
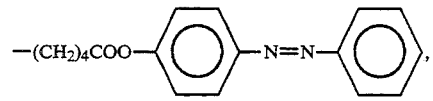
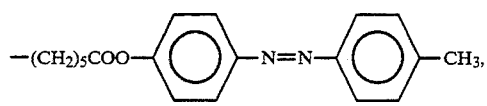
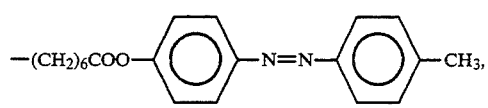
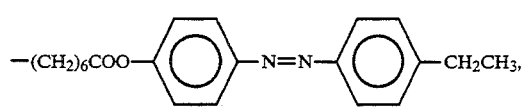
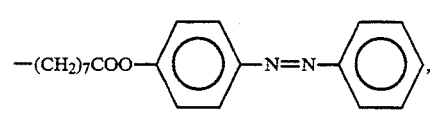
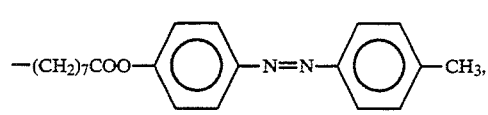
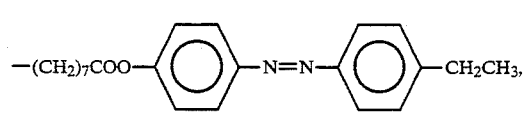
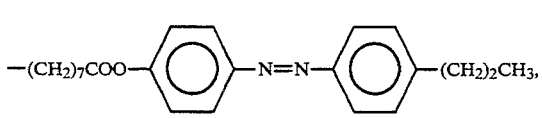
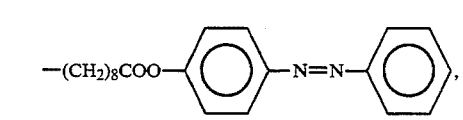
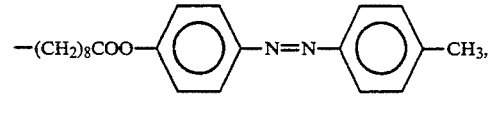
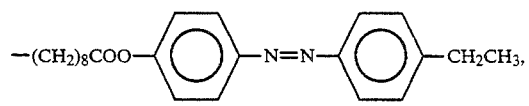
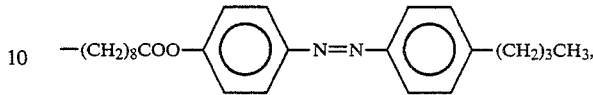
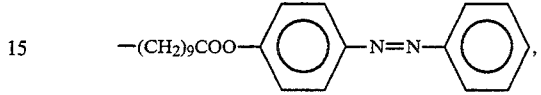
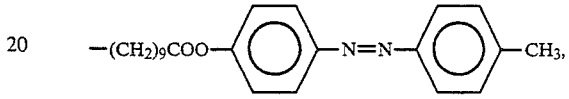
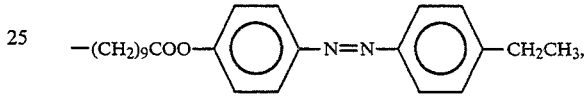
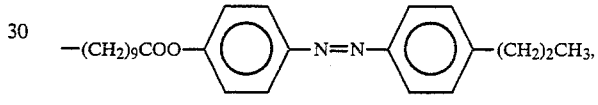
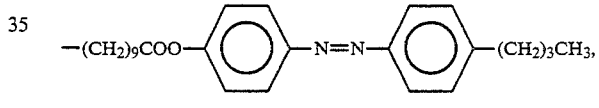
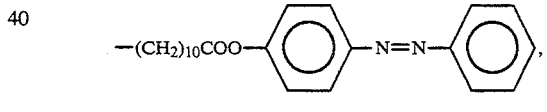
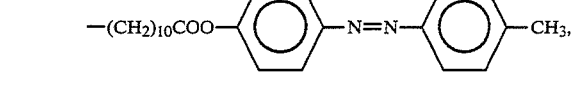
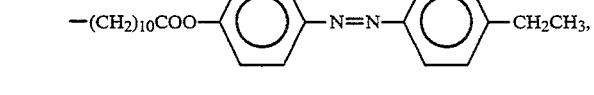
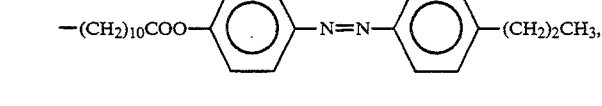
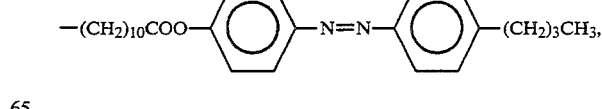
B is selected from the following exemplary chemical formulae where the chromophore moiety in the formula (III) group is an anthraquinone-containing one.

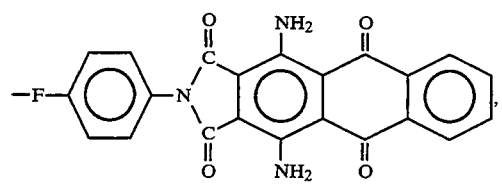
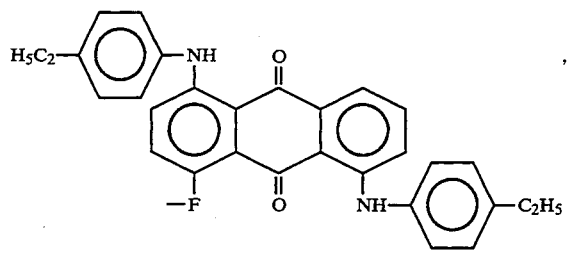
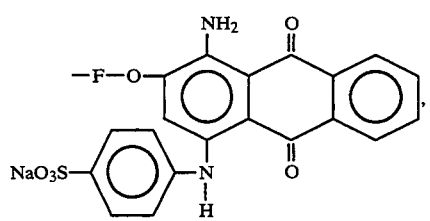
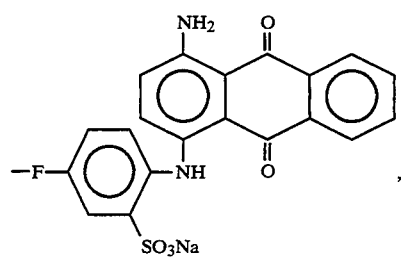
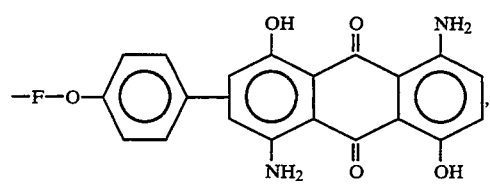
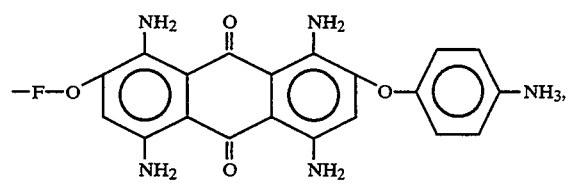
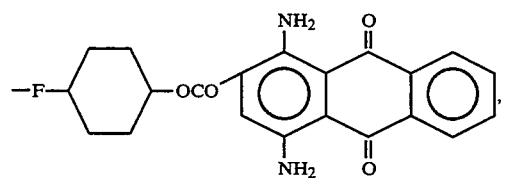

-continued

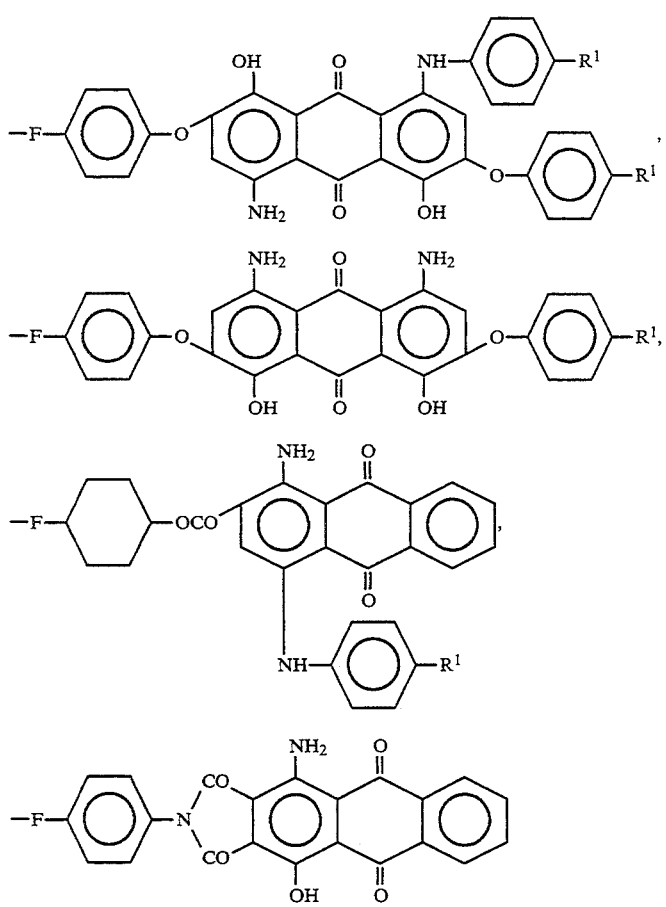

In the formulae, F and $R^1$ are as defined above.

As mentioned above, component B consists of a chromophore moiety (Z) and a spacer (F) for attaching the chromophore moiety to the siloxane backbone. The chromophore moiety is an essential component not only for achieving the original function of imparting coloring ability to the compounds of the invention, but also for the additional function of improving the orientation regularity of the mesogen group in component A, thereby contributing to increased response speed and widened effective temperature range.

It will be understood that a high molecular weight compound having a chromophore group incorporated at a side chain thereof tends to maintain its arrangement intact since the chromophore group is restrained for motion by the backbone. More specifically, once a cell is turned transparent or colored through the application of voltage, the chromophore group would maintain its attitude unchanged even after voltage interruption, achieving a high degree of transparency or coloring. In contrast, a simple blend of a liquid crystal and a low molecular weight dye substance in which a chromophore molecule of the dye substance is allowed for free motion provides comparable light transmittance (either transparent or colored) when voltage is applied, but after voltage is interrupted, undesirably experiences a loss of transmittance in the transparent state or an increase of transmittance in the colored state. It is thus critical that a chromophore group be attached to a high molecular weight chain.

Referring to formula (I) again, letters a, b, and c relate to the type, length, rate of modification of siloxane and are numbers meeting the requirement: $1 \leq a < 2$, $0 < b+c \leq 1$, and $1 < a+b+c \leq 3$, preferably $1.8 \leq a+b+c \leq 2.2$. The siloxane structure may be straight, cyclic, or branched, with the straight chain being preferred. The value of b/(b+c), that is, the proportion of components A and B, representing the rate of modification of siloxane ranges from 0.45 to 0.95, preferably from 0.55 to 0.85. No electrical memory would be achieved with a value of b/(b+c) of less than 0.45 whereas a value of b/(b+c) of more than 0.95 would result in an impractical liquid crystal temperature range.

The liquid crystalline organopolysiloxanes of formula (I) may be synthesized by effecting addition reaction of a mesogen compound having a terminal unsaturated bond and a chromophore group-containing compound having a terminal unsaturated bond to a siloxane having a Si—H group in the presence of a well-known catalyst for hydrosilylation although their preparation is not limited thereto.

For example, liquid crystalline organopolysiloxanes having formula (I):

$$R_a(A)_b(B)_cSiO_{(4-a-b-c)/2} \qquad (I)$$

wherein A is a group of formula (II):

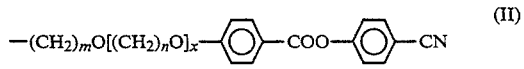

B is of formula (IIIa):

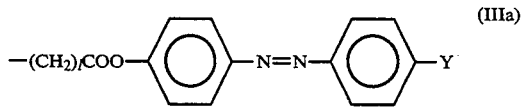  (IIIa)

wherein the symbols are as defined above can be readily synthesized by adding a compound of formula (IV):

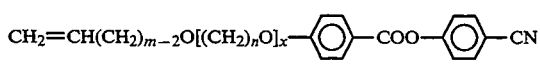  (IV)

and a compound of formula (V):

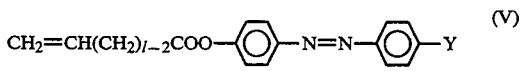  (V)

to an organohydrogenpolysiloxane through hydrosilylation reaction. It should be understood that if a compound of formula (IV) alone is addition reacted to organohydrogen-polysiloxane, there would be synthesized a high molecular weight liquid crystal having a narrower useful temperature range. By mixing compounds of formulae (IV) and (V) and reacting them with organohydrogenpolysiloxane for achieving co-modification, there is synthesized an organopolysiloxane having a useful temperature range extended to a practical range.

The organohydrogenpolysiloxane used herein may be selected from linear, branched and cyclic ones in accordance with the end organopolysiloxane, with the linear ones being preferred. Preferred organohydrogen-poly-siloxanes are of the following formula (VI):

$$R'_pH_qO_{(4-p-q)/2} \quad (VI)$$

wherein R' is a hydrocarbon group having 1 to 4 carbon atoms or a phenyl group, and letters p and q are numers in the range: $1 \leq p < 3$ and $0 < q \leq 1$, preferably $1 \leq p \leq 2$ and $0.5 \leq q \leq 1$. Exemplary compounds are of the following structures.

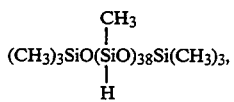

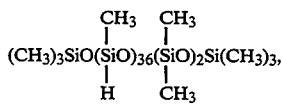

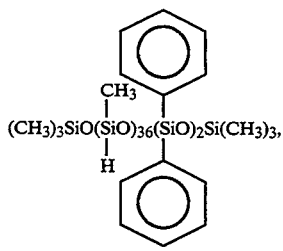

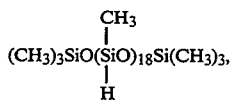

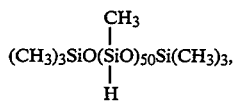

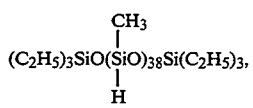

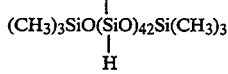

Desirably, hydrosilylation is effected in the presence of a catalyst. Examples of the catalyst include well-known platinum, palladium, and rhodium complexes, such as PtCl$_4$, H$_2$PtCl$_6$·6H$_2$O, Pt-ether complexes, Pt-olefin complexes, PdCl$_2$(PPh$_3$)$_2$, PdCl$_2$(PhCN)$_2$, and RhCl$_2$ (PPh$_3$)$_3$ wherein Ph is a phenyl group, other well-known hydrosilylating catalysts, and mixrures thereof. These catalysts are preferably used by diluting with suitable solvents such as alcohol, aromatic, hydrocarbon, ketone, and chloride solvents. The catalysts are used in catalytic amounts.

Reaction conditions desirably include about 60° to 150° C. and about 1 to 50 hours although no particular limit is necessary.

Reaction is desirably effected in organic solvents, for example, toluene, xylene, tetrahydrofuran, and dioxane.

After hydrosilylation, an olefin such as hexene may be introduced into the resulting compound by hydrosilylation in order to block the residual Si—H groups.

At the end of reaction, the end organic polysiloxane can be isolated by conventional procedures, for example, column chromatography, liquid chromatography, recrystallization, and reprecipitating fractionation and decantation utilizing differential solubility in various solvents.

The liquid crystalline organopolysiloxane of formula (I) has a wide, practical effective temperature range as liquid crystal and electrical memory ability and can be processed to have a large surface area. The additional feature of tinting permits one to visually distinguish the difference of orientation of liquid crystal without a need for a polarizing plate, ensuring manufacture of display elements. Thus the organopolysiloxane of formula (I) is effective as a high molecular weight liquid crystal in formulating a liquid crystal composition.

Accordingly, the liquid crystal composition in the second form of the present invention contains an organopolysiloxane of formula (I).

In one preferred embodiment, the liquid crystal composition comprises 35 to 80 parts by weight of the organopolysiloxane of formula (I) as a high molecular weight liquid crystal and 65 to 20 parts by weight of a low molecular weight liquid crystal. This liquid crystal composition is designed to enhance response by blending a high molecular weight liquid crystal of formula (I) with a low molecular weight liquid crystal. Little improvement in response would be achieved with less than 20 parts by weight of low molecular weight liquid crystal since such smaller amounts fail to reduce the liquid crystal viscosity so that the response at room temperature remains rather low. More than 65 parts by weight of low molecular weight liquid crystal would adversely affect the thermal stability of high molecular weight liquid crystal, the mechanical strength, the manufacture of large area elements, and memory nature. Better results are obtained with 35 to 55 parts by weight of the low molecular weight liquid crystal. Accordingly, the amount of high molecular weight liquid crystal ranges from 35 to 80 parts by weight, more preferably from 45 to 65 parts by weight. The term high molecular weight liquid crystal means that the compound has a plurality of recurring siloxane units as shown in formula (I) and a degree of polymerization of at least 3 whereas the low molecular weight liquid crystal is a compound free of any identical recurring unit within its molecule.

A liquid crystal mixture containing at least one nematic liquid crystal is a preferred low molecular weight liquid crystal used herein. Examples of the low molecular weight liquid crystal include biphenyl, cyanobiphenyl, phenylcyclohexane, cyanophenylcyclohexane, alkoxysubstituted phenylcyclohexane derived ones. Exemplary biphenyl derived liquid crystals are of formula (VII):

$$C_nH_{2n+1}-Ph\cdot Ph-C_mH_{2m+1} \quad (VII)$$

wherein n is 5 to 6, m is 2 to 6, and Ph is phenyl; exemplary cyanobiphenyl derived liquid crystals are of formulae (VIII) to (X):

$$C_nH_{2n+1}Ph\cdot Ph-CN \quad (VIII)$$

$$C_nH_{2n+1}-O-Ph\cdot Ph-CN \quad (IX)$$

wherein n=3 to 12, $$C_nH_{2n+1}-Ph\cdot Ph\cdot Ph-CN \quad (X)$$

wherein n=3 to 8; exemplary phenylcyclohexane derived liquid crystals are of formula (XI):

$$C_nH_{2n+1}-CyH\cdot Ph(Ph)_k-C_mH_{2m+1} \quad (XI)$$

wherein n=2 to 5, k=0, 1 or 2, CyH is cyclohexane; exemplary cyanophenylcyclohexane derived liquid crystals are of formulae (XII) and (XIII):

$$C_nH_{2n+1}-CyH\cdot Ph-CN \quad (XII)$$

wherein n=2 to 7, $$C_nH_{2n+1}-CyH\cdot Ph\cdot Ph-CN \quad (XIII)$$

wherein n=1 to 9; and exemplary alkoxy-substituted phenylcyclohexane derived liquid crystals are of formula (XIV):

$$C_nH_{2n+1}-CyH\cdot Ph-O-C_mH_{2m+1} \quad (XIV)$$

wherein m=2 to 6 and n=2 to 6.

To the liquid crystal composition, a dichroic dye may be used for enhancing the contrast of display elements without losing the remaining properties. Preferably, the dye is added in an amount of 0.3 to 10.0 parts by weight, more preferably 0.5 to 5.0 parts by weight, most preferably 0.5 to 2.5 parts by weight per 100 parts by weight of the total liquid crystals. The dichroic dyes used herein are those having a dichroism ratio in excess of 4 and include azo and anthraquinone dyes. Exemplary dichroic dyes are shown below.

For example, azo dyes having at least one azo group include mono—, di—, tris— and polyazo dyes as exemplified below.

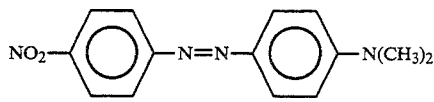

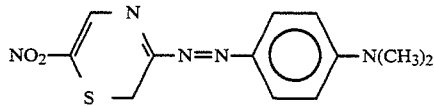

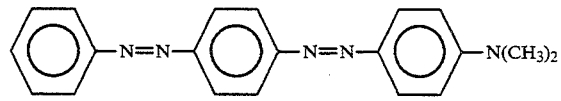

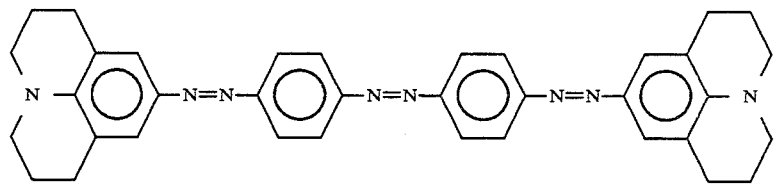

Exemplary anthraquinone dyes are below.

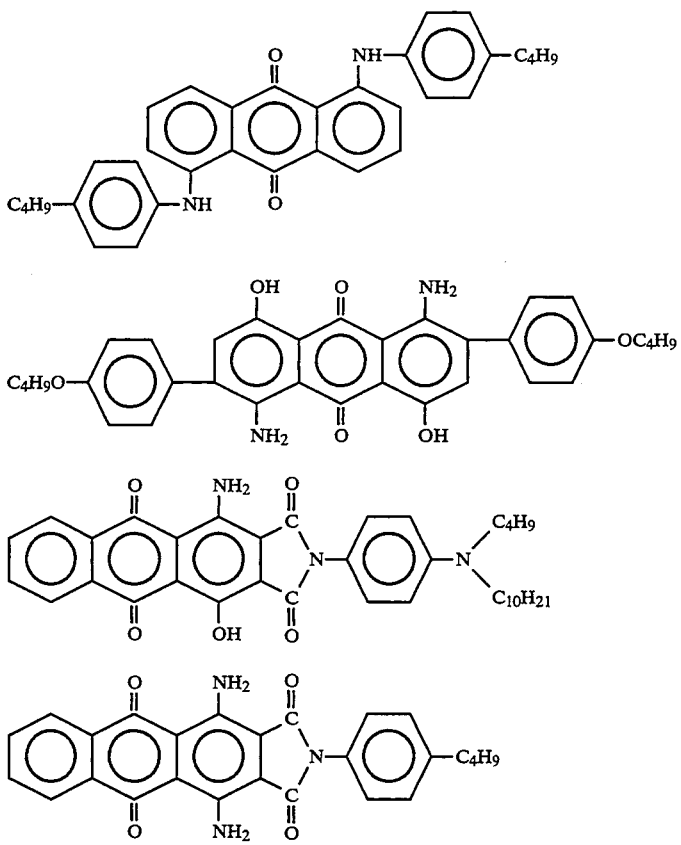

Also useful are merocyanine, styryl, azomethine, and tetrazine dyes as shown below.

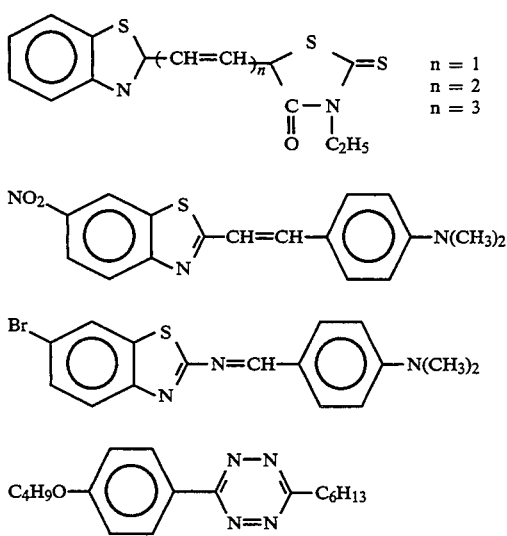

Use of these dichroic dyes helps enhance the contrast of liquid crystal display elements.

In a further preferred embodiment of the invention, the liquid crystal composition comprising a blend of a high molecular weight liquid crystal of formula (I) and a low molecular weight liquid crystal is further blended with a suitable amount of an organic electrolyte material, thereby shortening the response time from transparent to scattering state by the application of DC voltage, for example, to 1/7 or less of the response time of the electrolyte-free composition.

The organic electrolyte used herein may be selected from well-known organic electrolytes insofar as they can be uniformly dissolved or dispersed in the liquid crystal composition without adversely affecting the operation of display elements. For example, well-known cationic and anionic surfactants, ammonium salts, sodium salts, potassium salts, and calcium salts are useful. Among others, quatenaryammonium salts, especially ammonium salts resulting from tertiary amines and alkyl halides and ammonium salts resulting from tertiary amines and aromatic carboxylic acids are preferred for substantial reduction in the response time upon DC voltage application.

The organic electrolyte may be added in an amount of 0.01 to 0.5% by weight based on the weight of the liquid crystal mixture. Less than 0.01% of organic electrolyte is ineffective for the response time shortening purpose whereas no further improvement is expected in excess of 0.5%.

EXAMPLE

Examples of the present invention are given below by way of illustration and not by way of limitation.

Example 1

A separable flask equipped with a condenser, thermometer and stirrer was charged with 15.0 grams (0.046 mol) of a compound of formula (1), 5.0 grams (0.012 mol) of a compound of formula (2), and 100 grams of dioxane.

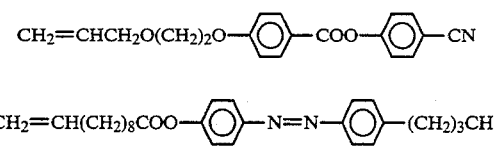 (1)

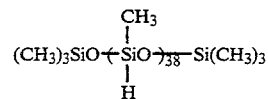 (2)

The contents were agitated while heating at 100° C. To the flask was added 0.06 grams of 0.03% chloroplatinic acid in 1-butanol. To the flask at 100° C. was added dropwise 3.4 grams (0.0014 mol) of an organohydrogenpolysiloxane of formula (3).

$$(CH_3)_3SiO+SiO)_{38}-Si(CH_3)_3 \quad (3)$$
$$\overset{|}{\underset{H}{CH_3}}$$

The solution was agitated for 15 hours at 100° C. At the end of reaction, excess hexane was added to the reaction solution and the resulting precipitate was collected by decantation. The precipitate was purified by dissolving it in acetone, adding excess methanol thereto, and collecting the resulting precipitate by decantation. Vacuum drying yielded 10.8 grams of a reddish orange organopolysiloxane.

The resultant organopolysiloxane was identified by proton nuclear magnetic resonance (NMR), obtaining the spectrum shown in FIG. 1. The following peaks were found.

δ=0 ppm: Si—$\underline{CH_3}$
0.2–0.7: Si—$\underline{CH_2}$—
0.7–0.9

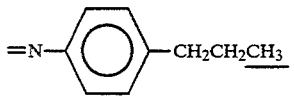

1.0–2.0: Si—$CH_2\underline{CH_2}CH_2O$—, Si—$CH_2(\underline{CH_2})_8CH_2$,

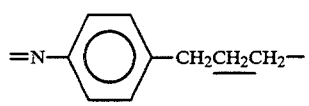

2.1–2.7:

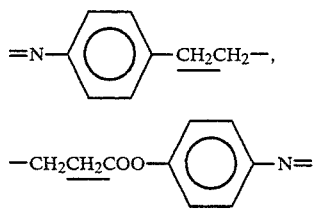

3.1–3.8:

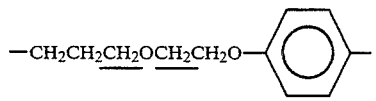

3.8–4.2:

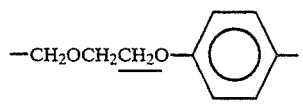

6.6–8.0:

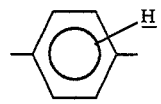

It is to be noted the NMR spectrum was analyzed by comparing with the NMR spectra of the two starting monomers.

UV spectroscopy showed a peak in promixity to λ max=340 nm, indicating the presence of an azo group. The compound was identified to have the following structure (4).

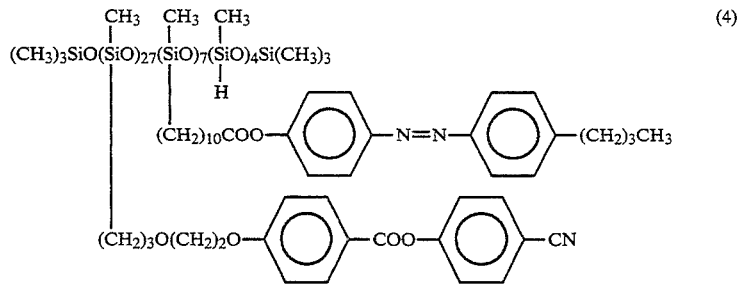 (4)

This organopolysiloxane was measured by a differential scanning calorimeter (DSC) and observed under a polarizing microscope, with the following results.

Glass transition temperature: —11° C. Melting point: 67° C.

This indicated a useful temperature range of from —11° C. to 67°0 C. where liquid crystalline nature was recognized.

The organopolysiloxane was admitted into a cell having a pair of opposed walls defining a gap of 30 μm, a transparent electrode coextensive over one wall, and a comb-shaped transparent electrode on the other wall. AC current having a voltage of 40 V and a frequency of 60 Hz was applied across the cell at 25° C. whereupon the organopolysiloxane was oriented in conformity to the comb-shape. After interruption of AC current, the orientation was maintained, indicating electrical memory ability. The cell was measured for light transmittance using light having a wavelength of 550 nm, finding a transmittance of 78% in the oriented state and 1% in the non-oriented state, which indicated liquid crystalline nature.

Example 2

The procedure of Example 1 was repeated except that 13.4 grams (0.042 mol) of the compound of formula (1) and 7.1 grams (0.017 mol) of the compound of formula (2) were used. There was obtained 11.2 grams of an organopolysiloxane.

The resultant organopolysiloxane was identified by proton NMR to have the following structure (5).

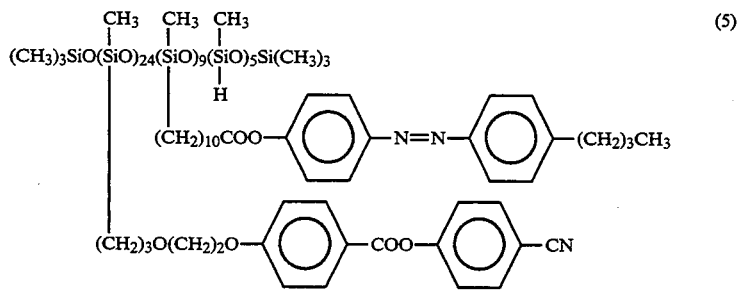

Its DSC measurement and polarizing microscope observation gave the following results.

Glass transition temperature: −15° C. Melting point: 70° C.

This indicated a useful temperature range of from −15° C. to 70° C. where liquid crystalline nature was recognized as well as electrical memory ability.

Example 3

The procedure of Example 1 was repeated except that 3.5 grams (0.012 mol) of a compound of formula (6) was used instead of the compound of formula (2).

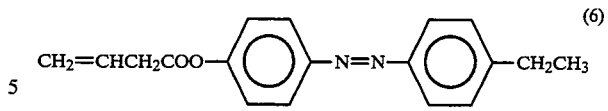

There was obtained 10.3 grams of an organopolysiloxane.

The resultant organopolysiloxane was identified by proton NMR to have the following structure (7).

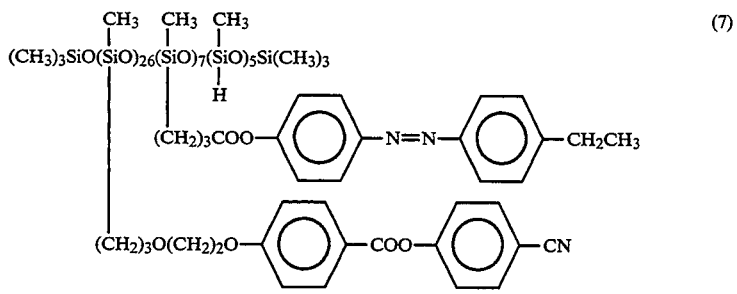

Its DSC measurement and polarizing microscope observation gave the following results.

Glass transition temperature: −3° C. Melting point: 61° C.

This indicated a useful temperature range of from −3° C. to 61° C. where liquid crystalline nature was recognized as well as electrical memory ability.

Example 4

The procedure of Example 1 was repeated except that 4.0 grams (0.012 mol) of a compound of formula (8) was used instead of the compound of formula (2).

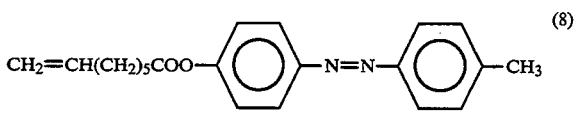

There was obtained 10.6 grams of an organopolysiloxane.

The resultant organopolysiloxane was identified by proton NMR to have the following structure (9).

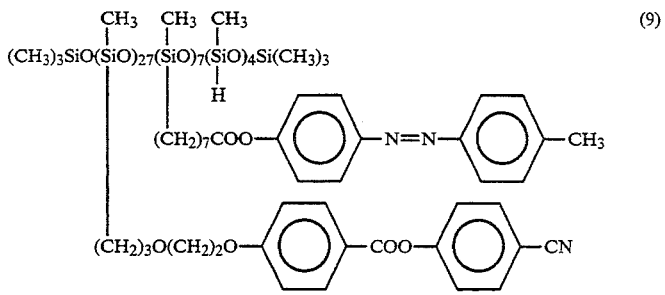

Its DSC measurement and polarizing microscope observation gave the following results.

Glass transition temperature: −7° C. Melting point: 63° C.

This indicated a useful temperature range of from −7° C. to 63° C. where liquid crystalline nature was recognized as well as electrical memory ability.

Example 5

The procedure of Example 1 was repeated except that 17.0 grams (0.046 mol) of a compound of formula (10) was used instead of the compound of formula (1) and 3.5 grams (0.014 mol) of a compound of formula (11) was used instead of the compound of formula (3).

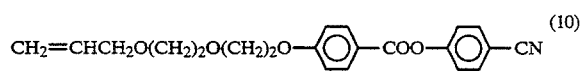

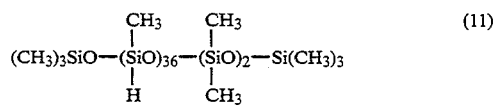

There was obtained 11.9 grams of an organopolysiloxane.

The resultant organopolysiloxane was identified by proton NMR to have the following structure (12).

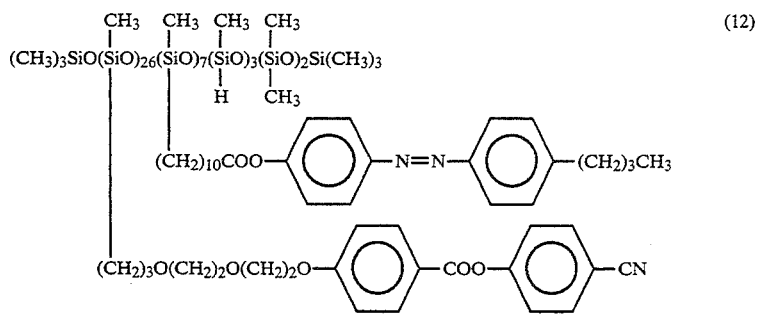

Its DSC measurement and polarizing microscope observation gave the following results.

Glass transition temperature: −10° C. Melting point: 70° C.

This indicated a useful temperature range of from −10° C. to 70° C. where liquid crystalline nature was recognized as well as electrical memory ability.

Example 6

The procedure of Example 1 was repeated except that 21.0 grams (0.046 mol) of a compound of formula (13) was used instead of the compound of formula (1).

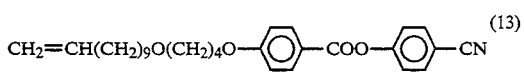

There was obtained 13.8 grams of an organopolysiloxane.

The resultant organopolysiloxane was identified by proton NMR to have the following structure (14).

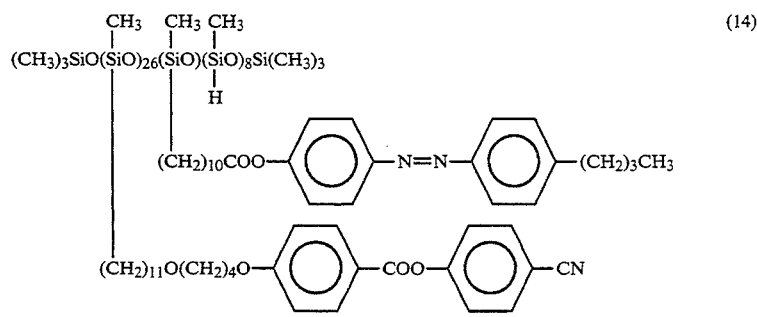

Its DSC measurement and polarizing microscope observation gave the following results.

Glass transition temperature: −20° C. Melting point: 30° C.

This indicated a useful temperature range of from −20° C. to 30° C. where liquid crystalline nature was recognized as well as electrical memory ability.

of formulae (A) to (D) in the proportion shown in Table 1.

High molecular weight liquid crystal

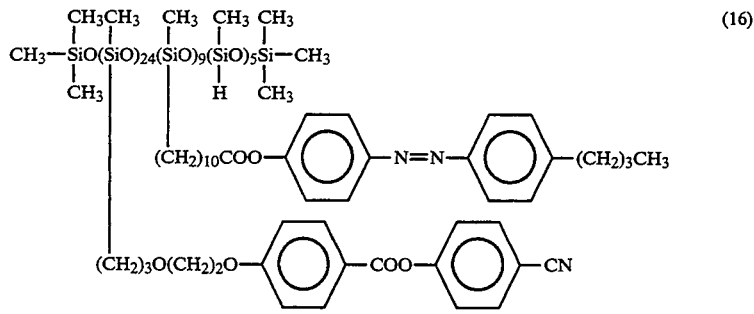

(16)

Comparative Example 1

The procedure of Example 1 was repeated except that 18.7 grams (0.058 mol) of the compound of formula (1) and 3.4 grams (0.0014 mol) of the compound of formula (3) were used and the compound of formula (2) was omitted. There was obtained 11.2 grams of an organopolysiloxane.

The resultant organopolysiloxane was identified by proton NMR to have the following structure (15).

Low molecular weight liquid crystal
(A) $C_4H_9$—O—Ph·Ph—CN
(B) $C_4H_9$—CyH·Ph—CN
(C) $C_5H_{11}$CyH·Ph—CN
(D) a mixture of low molecular weight liquid crystals

| | |
|---|---|
| $C_3H_7$-CyH.Ph.O—$C_2H_5$ | 20% |
| $C_3H_7$-CyH.Ph-CN | 30% |
| $C_3H_7$- CyH.Ph-O—$C_4H_9$ | 20% |
| $C_5H_{11}$-CyH.Ph-CN | 20% |
| $C_5H_{11}$-CyH.Ph.Ph-$C_2H_5$ | 5% |
| $C_5H_{11}$-CyH(Ph)$_2$CyH—$C_3H_7$ | 5% |

(% by weight, CyH = cyclohexane, Ph = phenyl)

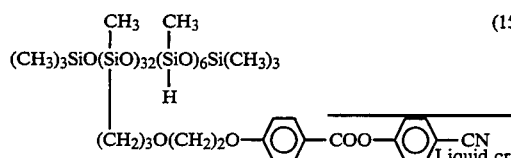

(15)

TABLE 1

| Liquid crystal mixture | | | | Light transmittance | | Memory (days) | Response time (sec.) | |
|---|---|---|---|---|---|---|---|---|
| High - MW LC | | Low - MW LC | | | | | Colored → transp. | Transp. → colored |
| No. | Type | Amount (wt %) | Type | Amount (wt %) | Transp. (%) | Colored (%) | | | |
| 1 | (16) | 70 | A | 30 | 48 | 1 | ≧60 | 110 | 180 |
| 2 | (16) | 60 | A | 40 | 64 | 1 | ≧60 | 30 | 100 |
| 3 | (16) | 50 | A | 50 | 76 | 5 | 7 | 7 | 25 |
| 4 | (16) | 70 | B | 30 | 51 | 5 | 14 | 41 | 63 |
| 5 | (16) | 60 | B | 40 | 75 | 27 | 3 | 18 | 30 |
| 6 | (16) | 50 | C | 50 | 40 | 2 | ≧60 | 22 | 80 |
| 7 | (16) | 70 | D | 30 | 42 | 1 | ≧60 | 86 | 140 |
| 8 | (16) | 60 | D | 40 | 54 | 1 | ≧60 | 26 | 95 |
| 9 | (16) | 50 | D | 50 | 65 | 1 | 14 | 15 | 60 |

Its DSC measurement and polarizing microscope observation gave the following results.

Glass transition temperature: 7° C. Melting point: 49° C.

This indicated a useful temperature range of from 7° C. to 49° C. where liquid crystalline nature was recognized as well as electrical memory ability. Actually, however, this organopolysiloxane could not be used outdoor as compared with the organopolysiloxane of Example 1. It showed inferior contrast to Example 1 as demonstrated by transmittance of 60% in the oriented state and 5% in the non-oriented state.

Example 7

Figure 2:
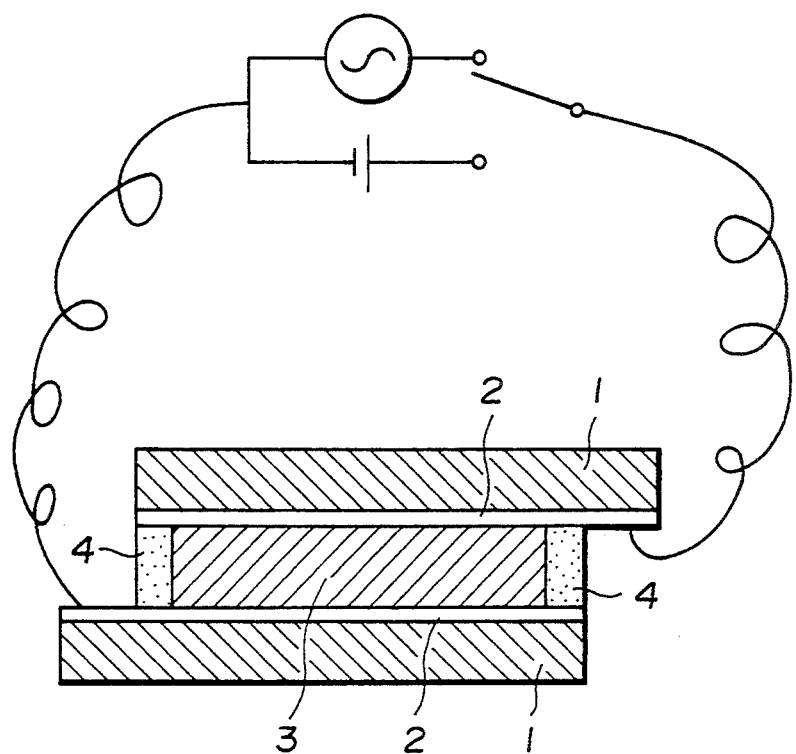
FIG. 2 is a schematic cross section of a cell used in the evaluation of the liquid crystals of Examples 7 and 8.

Liquid crystal composition Nos. 1 to 9 were prepared by mixing a high molecular weight liquid crystal of formula (16) with low molecular weight liquid crystals More particularly, the high molecular weight liquid crystal of formula (16) and each low molecular weight liquid crystal were mixed by dissolving them in xylene in the proportion shown in Table 1 and heating the solution for about 12 hours at 130° C. in vacuum until the xylene was removed. The residue was admitted into a cell as shown in FIG. 2 to a thickness of 30 μm. The liquid crystal cell is shown in FIG. 2 as comprising a pair of glass substrates 1 having transparent electrodes 2 on their inner surface. The cell is filled with a liquid crystal mixture 3 which is confined therein by a sealant 4.

At room temperature, the cell was measured for light transmittance at a wavelength of 550 nm both when the cell was turned transparent by applying an AC voltage of 100 to 250 V at 400 Hz across the electrodes and when the cell was turned colored by applying a DC voltage of 150 to 250 V across the electrodes. In this way, the liquid crystal composition could be switch driven by AC-DC changeover. When colored, this liquid crystal composition became yellow turbid due to the chromophore group in the high molecular weight liquid crystal.

Memory ability was expressed by the number of days passed from the turning-off of the voltage until a change of more than 5% from the initial transmittance occurred.

The response time from colored to transparent state was expressed by the time (sec.) passed from the application of AC 150 V, 60 Hz (rectangular wave) until the cell became transparent, and the response time from transparent to colored state was expressed by the time (sec.) passed from the application of DC 200 V until the cell was colored.

Figure 3:
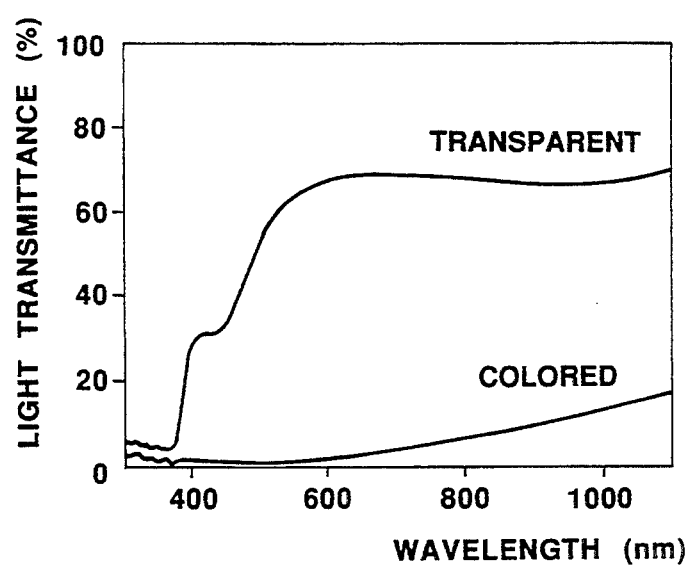
FIG. 3 is a diagram of light transmittance versus wavelength showing the drive characteristic of the liquid crystal of Example 7.

The driving characteristic of liquid crystal composition No. 9 is shown in FIG. 3. In the transparent state, it showed substantially constant transmittance relative to wavelength, indicating superior transparency.

All these liquid crystal compositions exhibited high contrast (or a larger difference in transmittance), improved memory ability, and shortened response time.

The liquid crystal compositions can be used as lighting control glass and display elements in automobile, housing, and other applications.

Example 8

In order to demonstrate that the addition of a dichroic dye helps enhance the contrast as lighting control glass and display elements, a mixture of high and low molecular weight liquid crystals was blended with a dichroic dye as shown in Table 2. The high and low molecular weight liquid crystals used were the same as in Example 7. The dye used was an anthraquinone dichroic dye commercially available as G209 (Blue) from Nippon Kanko Shikiso Kenkyujo.

TABLE 2

| Composition No. | Low - MW LC type | High - MW LC wt % | Low - MW LC Dye wt % | parts* |
| --- | --- | --- | --- | --- |
| 10 | A | 50 | 50 | 1.5 |
| 11 | B | 65 | 35 | 1.5 |
| 12 | C | 50 | 50 | 1.5 |
| 13 | D | 50 | 50 | 1.5 |

More particularly, the high molecular weight liquid crystal of formula (16), each low molecular weight liquid crystal, and the dye were mixed by dissolving them in xylene in the proportion shown in Table 2 and heating the solution for about 12 hours at 130° C. in vacuum until the xylene was removed. The residue was admitted into a cell as shown in FIG. 2 to a thickness of 30 μm, followed by deaeration. The liquid crystal cell, as shown in FIG. 2, included a pair of glass substrates 1 having transparent electrodes 2 on their inner surface and was filled with a liquid crystal mixture 3 which was confined therein by a sealant 4.

The cell was examined for light transmittance, memory ability, and color tone.

At room temperature, the cell was measured for light transmittance at a wavelength of 550 nm both when the cell was turned transparent by applying an AC voltage of 100 to 250 V at 400 Hz across the electrodes and when the cell was turned colored by applying a DC voltage of 150 to 250 V across the electrodes.

Memory ability was labeled OK when the light transmittance achieved with applied voltage did not change by 5% or more within 24 hours from the turning-off of the voltage.

The results are shown in Table 3.

TABLE 3

| No. | Light transmittance Transp. (%) | Light transmittance Colored (%) | Memory | Tone Transp. | Tone Colored |
| --- | --- | --- | --- | --- | --- |
| 10 | 65 | 2 | OK | pale green transparent | green turbid |
| 11 | 55 | 5 | OK | pale green transparent | green turbid |
| 12 | 36 | 1 | OK | pale green transparent | green turbid |
| 13 | 60 | 0.5 | pale | green green transparent | turbid |

As is evident from Table 3, the dye addition resulted in an increased difference in light transmittance between the transparent and colored states and improved display performance with respect to memory and tone.

Figure 4:
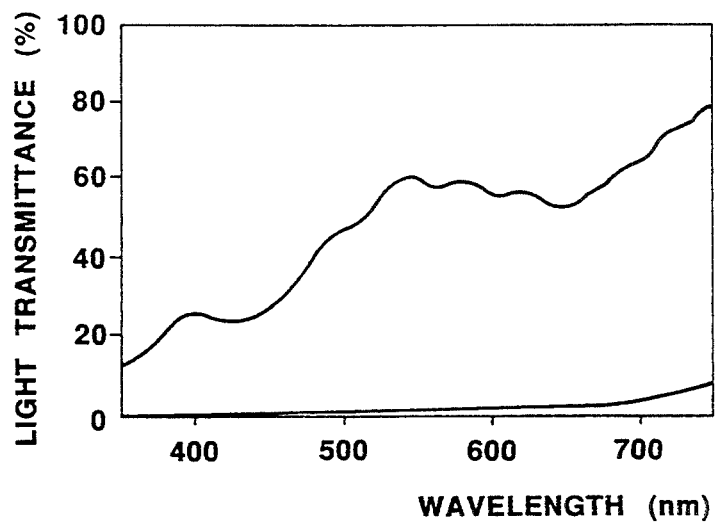
FIG. 4 is a diagram of light transmittance versus wavelength showing the driving characteristic of the liquid crystal of Example 8.

The driving characteristic of dyed liquid crystal composition No. 13 is shown in FIG. 4. Despite the inclusion of the dye, the composition showed acceptable light transmittance in the transparent state and a transmittance of approximately 0 in the colored state. It quickly responded to a changeover between AC ad DC to turn transparent or colored with high contrast and memory ability.

Example 9

Three liquid crystal composition Nos. 14 to 16 were prepared by adding 0.1% by weight of organic electrolytes L, M and N shown below to a liquid crystal mixture of 65 parts by weight of a high molecular weight liquid crystal of formula (16) and 35 parts by weight of a low molecular weight liquid crystal (ZLI-1840 commercially available from Merck Co.). The same liquid crystal mixture free of an organic electrolyte is designated liquid crystal composition No. 17.

Organic electrolyte L: $(C_4H_9)_4N^+Cl^- \cdot H_2O$ No. 14
Organic electrolyte M: $(C_4H_9)_4N^+Br^-$ No. 15
Organic electrolyte N: NLI-235 (Merck Co.) No. 16

Each liquid crystal composition (Nos. 14–16) was prepared by dissolving the high and low molecular weight liquid crystals in xylene, adding the organic electrolyte to the solution, uniformly dispersing the electrolyte therein, and heating the solution for about 12 hours at 130° C. in vacuum until the xylene was removed. It is to be understood that composition No. 17 was obtained by similarly concentrating the solution, but without adding an organic electrolyte.

Figure 5:
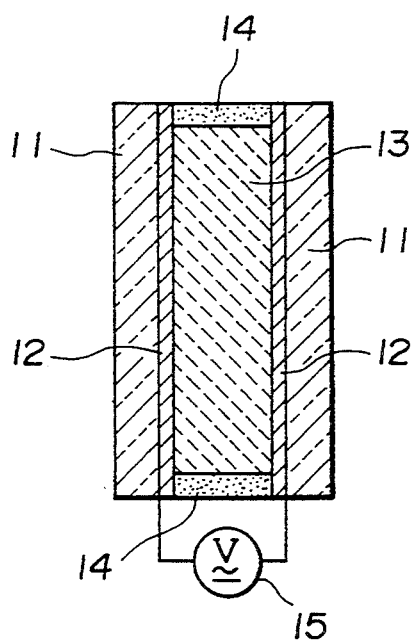
FIG. 5 is a schematic cross section of a cell used in the evaluation of the liquid crystal composition of Example 9.

These liquid crystal compositions were examined for response time using a liquid crystal element as shown in FIG. 5. The liquid crystal element is shown in FIG. 5 as comprising a pair of 1.1-mm thick substrates 11 of soda-lime glass having transparent electrodes 12 in the form of 150-nm thick ITO film on their inner surface. The element is filled with a liquid crystal composition 13 which is confined therein by a sealant 14 in the form of 30-μm thick heat fusible film. A power supply 15 of AC-DC switchable type is connected to the electrodes 12 for applying a selected voltage across the liquid crystal fill.

The liquid crystal elements filled with liquid crystal composition Nos. 14 to 17 were tested by applying a DC voltage of 100 V across the transparent electrodes at room temperature and measuring the time taken until the element turned opaque from the transparent state. The results are shown in Table 4.

TABLE 4

| Composition No. | Response time (DC drive) |
|---|---|
| 14 | 13 sec. |
| 15 | 25 sec. |
| 16 | 42 sec. |
| 17 | 350 sec. |

As compared with composition No. 17 which was free of an organic electrolyte, composition Nos. 14 to 16 containing a quaternary ammonium salt were significantly shortened in response time.

The liquid crystal elements were also tested for response time from opaque to transparent state by AC 100 V, 1 kHz driving. The results are shown in Table 5.

TABLE 5

| Composition No. | Response time (AC drive) |
|---|---|
| 14 | 22 sec. |
| 15 | 150 sec. |
| 16 | 80 sec. |
| 17 | 150 sec. |

As compared with electrolyte-free composition No. 17 showing a response time of 150 seconds, composition Nos. 14 and 16 showed a shortened response time of 22 and 80 seconds, respectively, although composition No. 15 remained unchanged in response time from No. 17. This indicates that the addition of selected quaternary ammonium salts can shorten the response time upon application of AC voltage.

Figure 6:
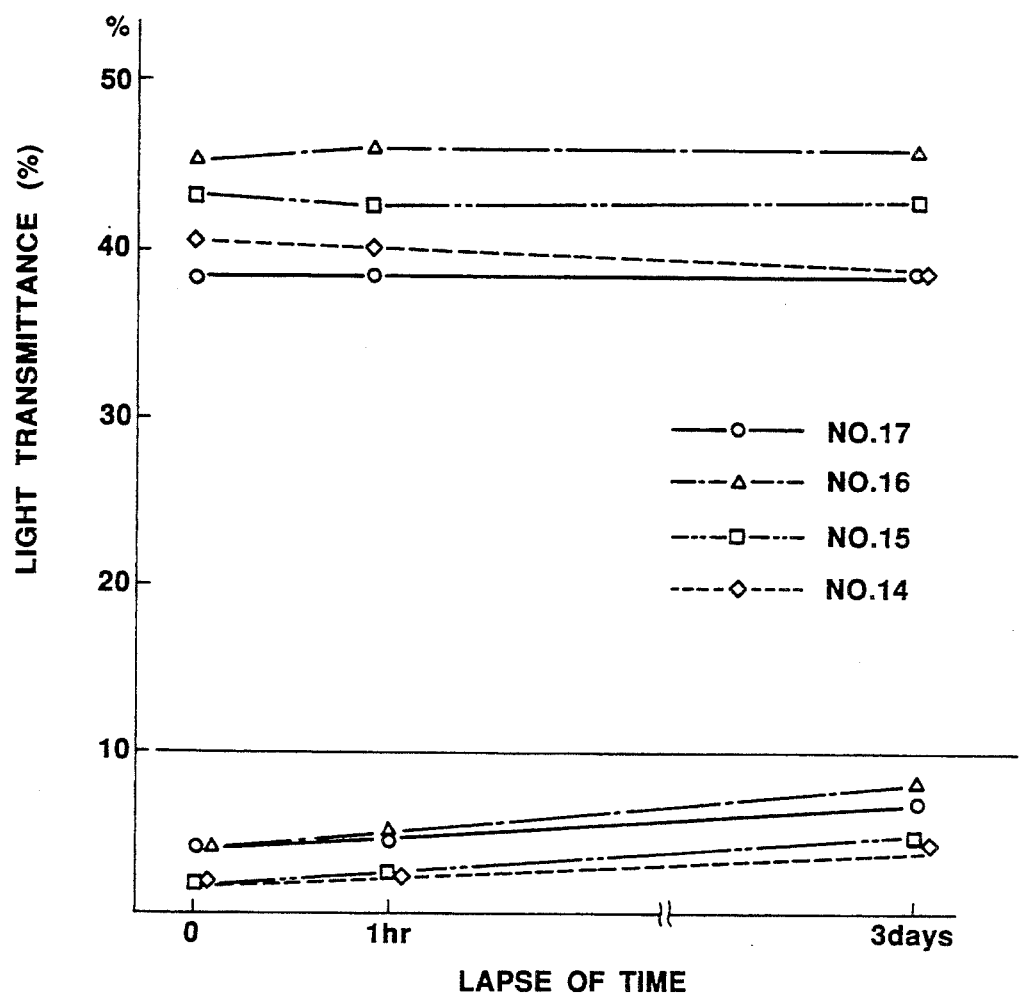
FIG. 6 is a graph of light transmittance versus standing time, showing the memory performance of the liquid crystal composition of Example 9.

It was found that blending of such organic electrolytes did not alter optical memory performance. FIG. 6, which is a diagram of light transmittance relative to the lapse of time, shows the memory performance of liquid crystal composition Nos. 14 to 17. Upper curves show how the once AC driven liquid crystal display elements change their light transmittance with time after switching off. Lower curves show how the once DC drive liquid crystal display elements (remaining dark) change their light transmittance with time after switching off. In either case, electrolyte-containing composition Nos. 14–16 showed substantially straight lines with the lapse of time as did electrolyte-free composition No. 17. That is, all the compositions maintained memory ability. Unlike low molecular weight liquid crystals, the addition of organic electrolytes does not adversely affect the memory performance.

Figure 7:
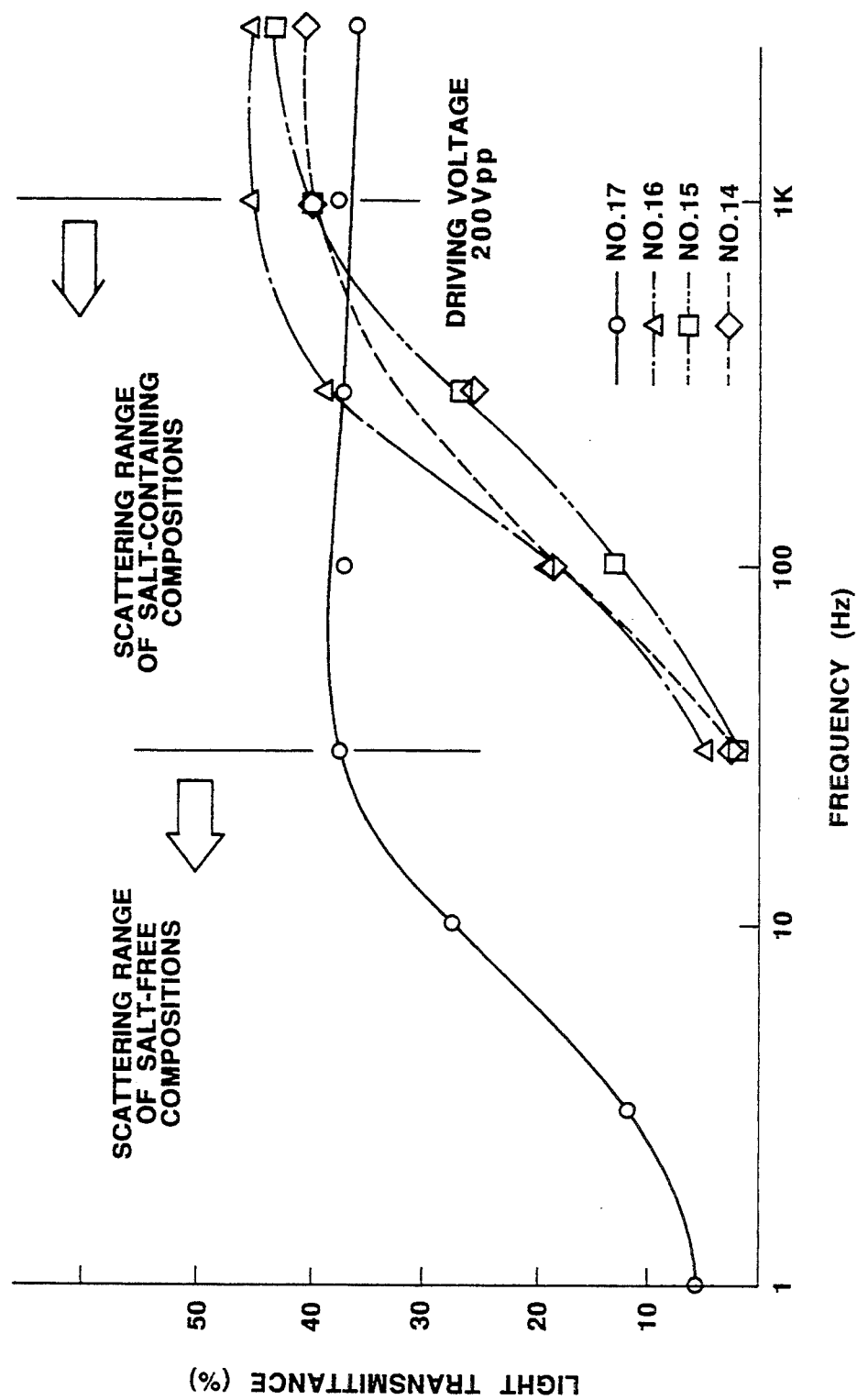
FIG. 7 is a graph of light transmittance versus drive frequency, showing the driving of the liquid crystal composition of Example 9.

FIG. 7 shows the light transmittance of liquid crystal composition Nos. 14–17 relative to driving frequency. Scattering occurred with electrolyte-free composition No. 17 in the low frequency range while the electrolyte addition caused the scattering range to shift toward higher frequencies (composition Nos. 14–16).

Although some preferred embodiments have been described, many modifications and variations may be made thereto in the light of the above teachings. It is therefore to be understood that within the scope of the appended claims, the invention may be practiced otherwise than as specifically described.

We claim:

1. A liquid crystalline organopolysiloxane having the general formula (I):

wherein R is independently selected from the group consisting of a hydrogen atom, hydrocarbon group having 1 to 4 carbon atoms, and phenyl group,
A is a group of the formula (II):

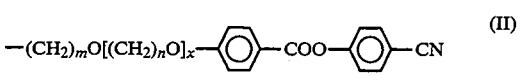

wherein m, n, and x are integers in the range: $m \geq 3$, $n \geq 2$, $5 \leq m + nx \leq 15$, $x = 1$ or 2,
B is selected from the group consisting of

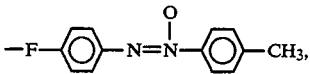

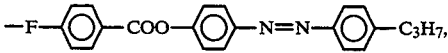

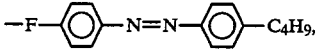

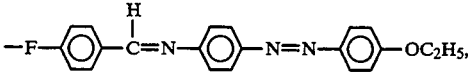

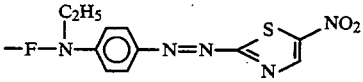

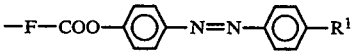

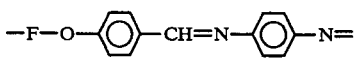

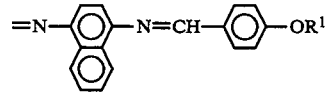

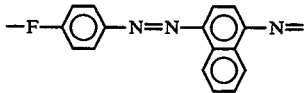

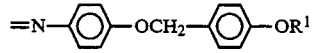

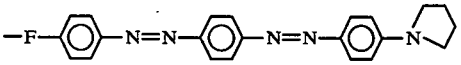

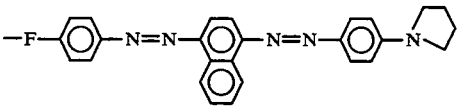

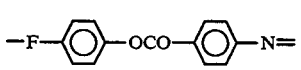

-continued

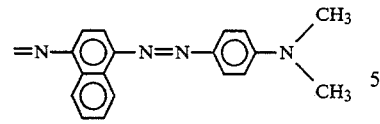

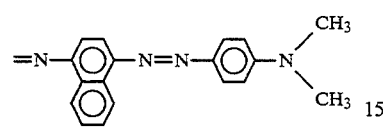

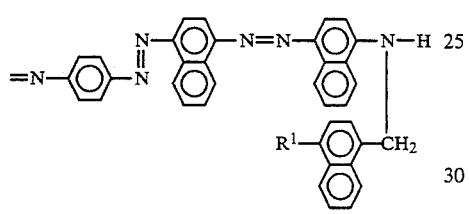

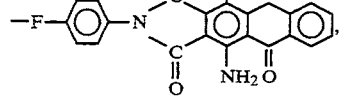

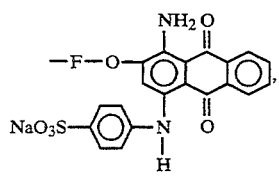

-continued

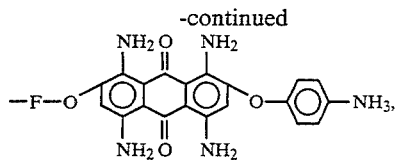

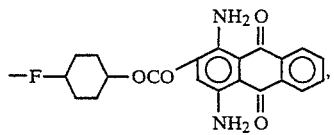

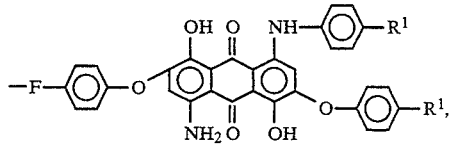

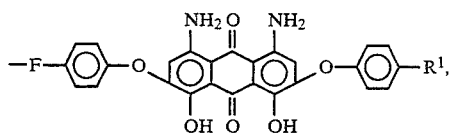

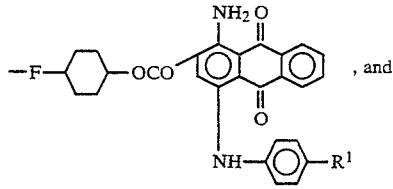

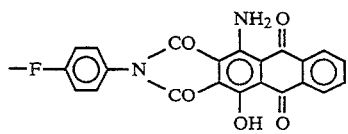, and wherein F is a linear or branched alkylene group having 1 to 12 carbon atoms and may optionally contain —O—, —COO— or —OCO— in the chain, and $R^1$ is an alkyl group having 1 to 8 carbon atoms, letters a, b, and c are numbers in the range: $1 \leq a < 2$, $0 < b+c \leq 1$, $0.45 \leq b/(b+c) \leq 0.95$, and $1 < a+b+c \leq 3$.

2. The liquid crystalline organopolysiloxane according to claim 1, wherein A is selected from the group consisting of

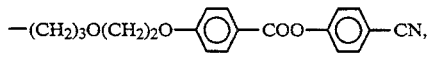

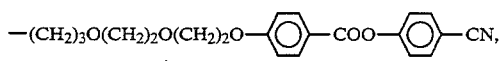

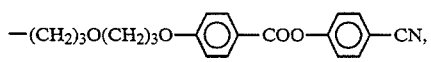

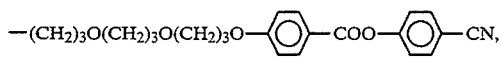

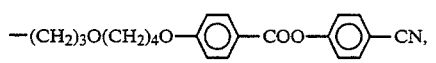

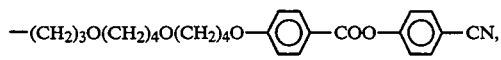

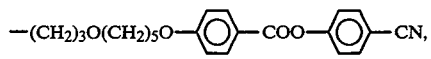

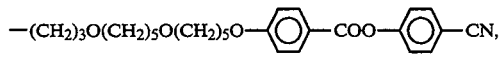

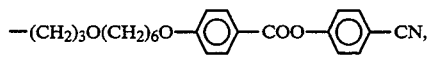

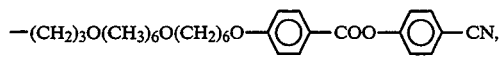

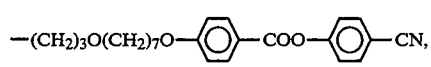

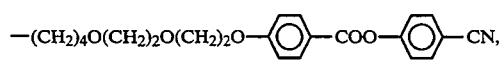

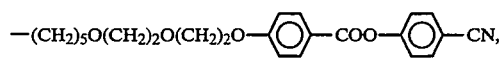

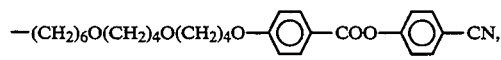

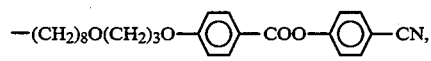

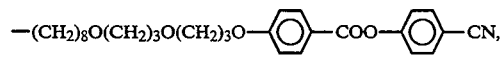

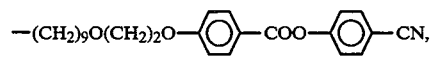

3. The liquid crystalline organopolysiloxane according to claim 1, wherein $1.8 \leq a+b+c \leq 2.2$.

4. The liquid crystalline organopolysiloxane according to claim 1, having the formula

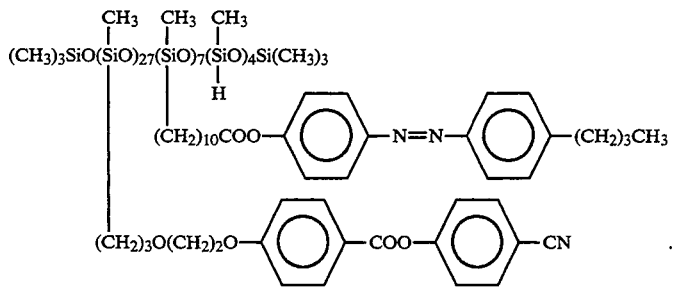

5. The liquid crystalline organopolysiloxane according to claim 1, having the formula

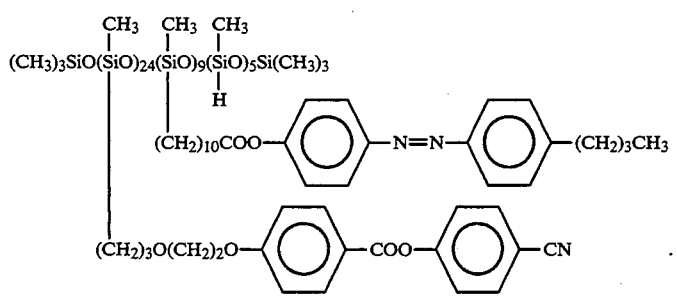

6. The liquid crystalline organopolysiloxane according to claim 1, having the formula

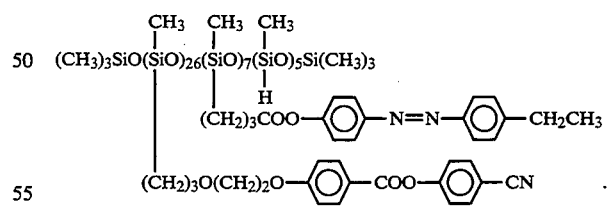

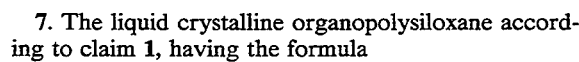

7. The liquid crystalline organopolysiloxane according to claim 1, having the formula

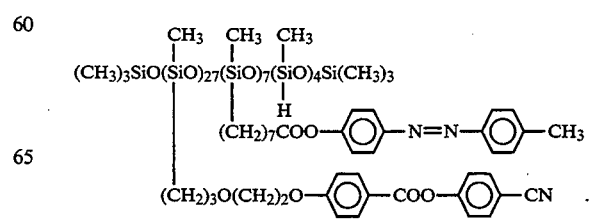

8. The liquid crystalline organopolysiloxane according to claim 1, having the formula

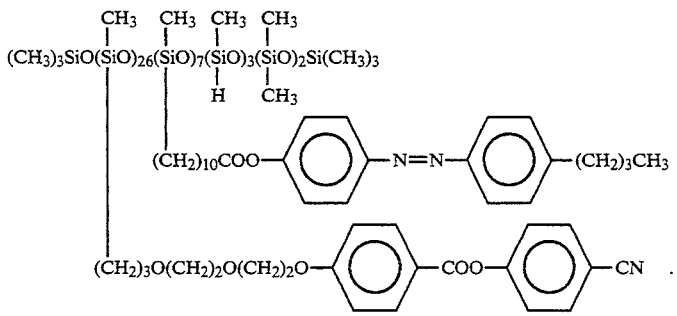

9. The liquid crystalline organopolysiloxane according to claim 1, having the formula

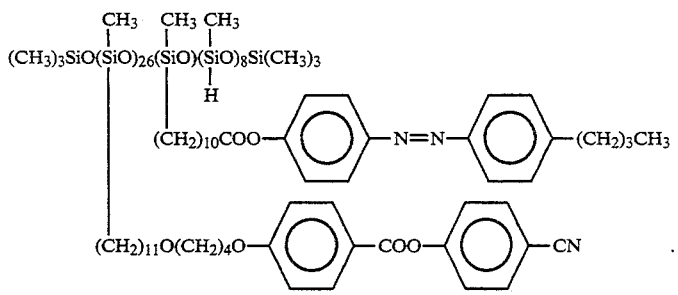

10. A liquid crystalline organopolysiloxane having the general formula (I):

$$R_a(A)_b(B)_cSiO_{(4-a-b-c)/2} \qquad (I)$$

wherein R is independently selected from the group consisting of a hydrogen atom, hydrocarbon group having 1 to 4 carbon atoms, and phenyl group, A is a group of the formula (II):

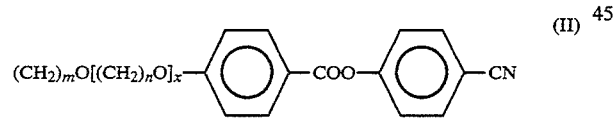

wherein m, n, and x are integers in the range: $m \geq 3$, $n \geq 2$, $5 \leq m+nx \leq 15$, $x=1$ or $2$, B is of the formula (IIIa):

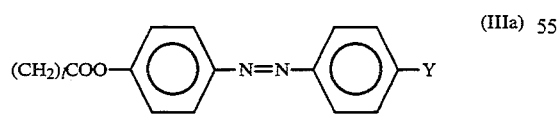

wherein Y is a hydrogen atom or a monovalent hydrocarbon group having 1 to 4 carbon atoms, and f is an integer of from 3 to 10, and letters a, b and c are numbers in the range: $1 \leq a < 2$, $0 < b+c \leq 1$, $0.45 \leq b/(b+c) \leq 0.95$, and $1 < a+b+c \leq 3$.

11. The liquid crystalline organopolysiloxane according to claim 10, wherein B is selected from the group consisting of

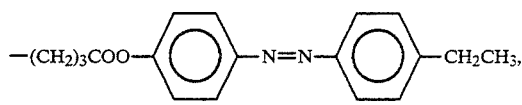

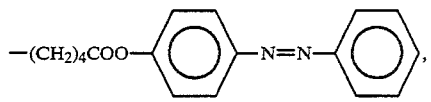

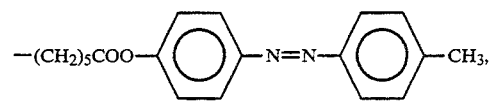

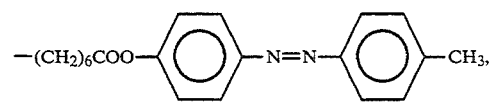

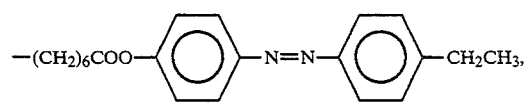

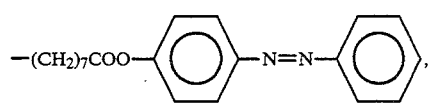

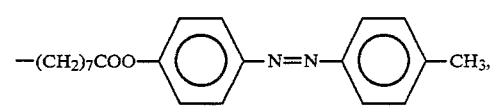

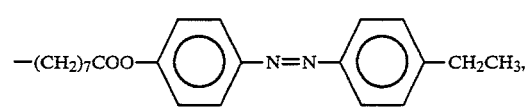

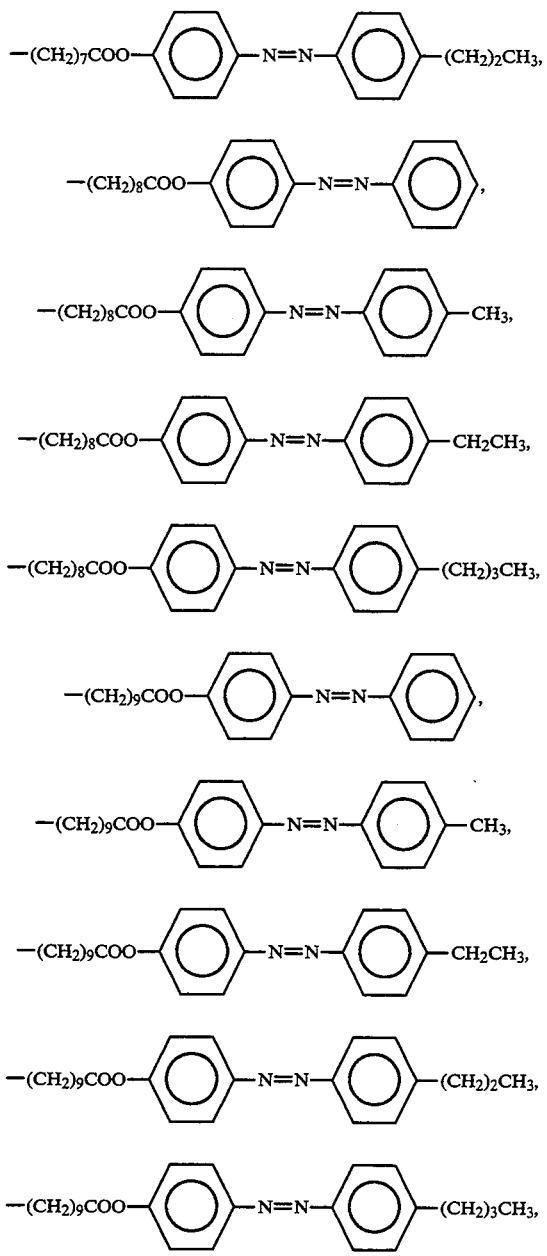

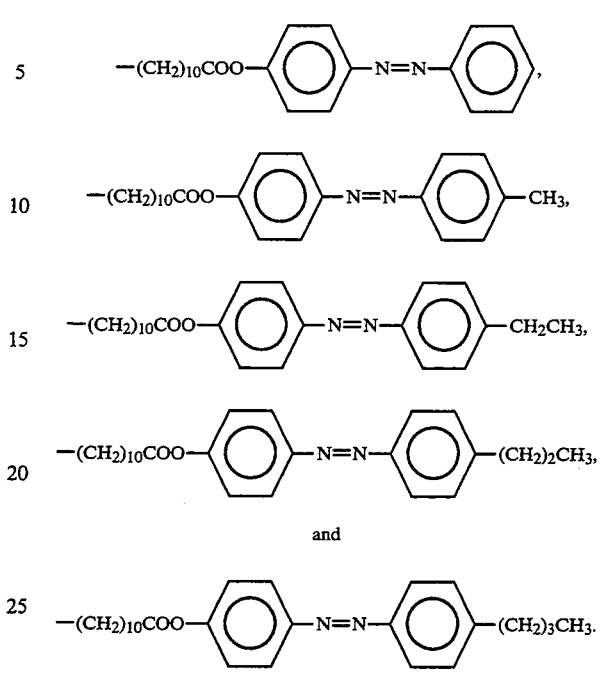

and

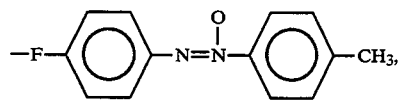

12. A liquid crystal composition comprising as a high molecular weight liquid crystal a liquid crystalline organopolysiloxane having the general formula (I):

$$R_a(A)_b(B)_c SiO_{(4-a-b-c)/2} \qquad (I)$$

wherein R is independently selected from the group consisting of a hydrogen atom, hydrocarbon group having 1 to 4 carbon atoms, and phenyl group, A is a group of the formula (II):

wherein m, n, and x are integers in the range: $m \geq 3$, $n \geq 2$, $5 \leq m+nx \leq 15$, $x = 1$ or $2$, B is selected from the group consisting of

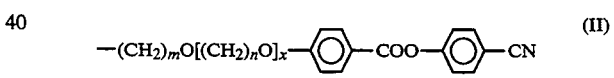

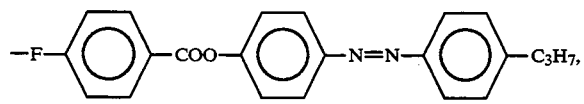

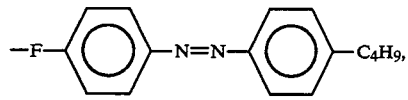

-continued
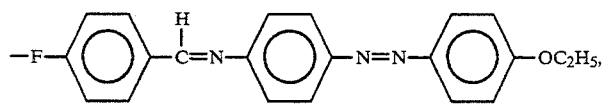
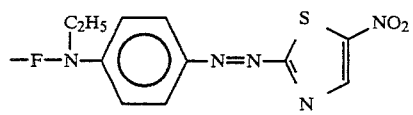
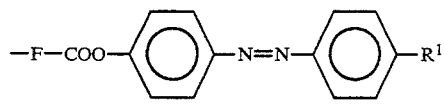
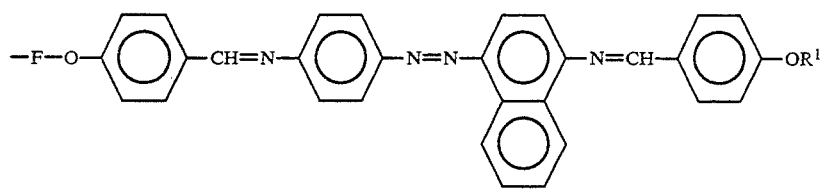
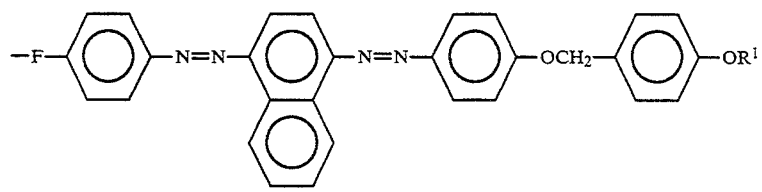
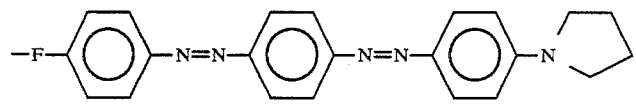
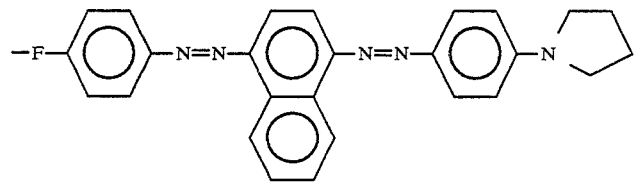
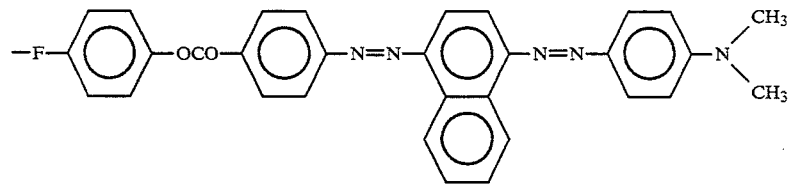
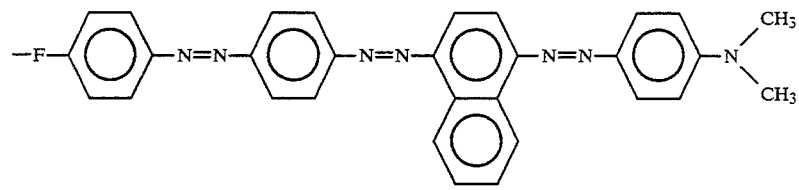

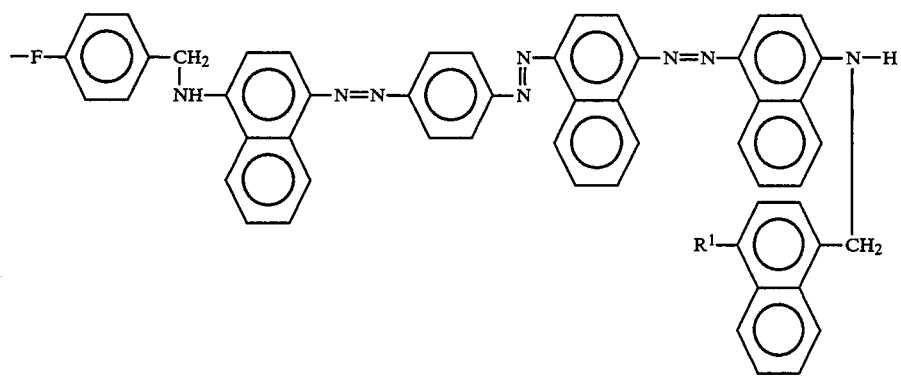
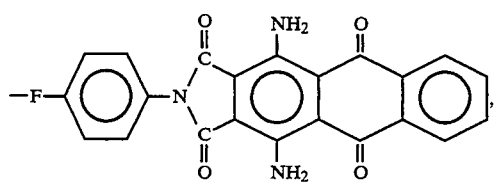
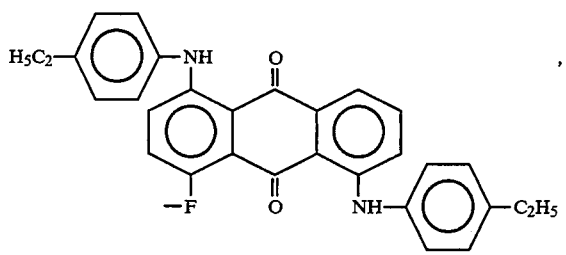
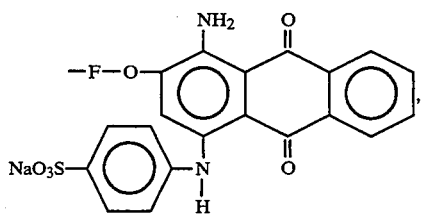
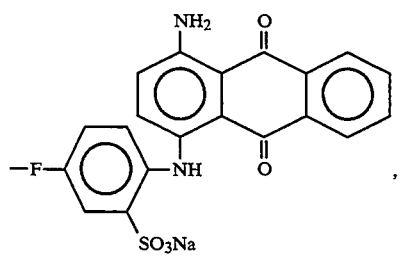
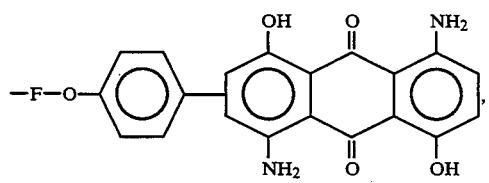
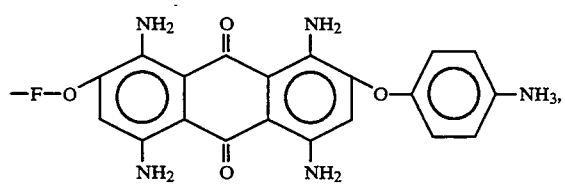

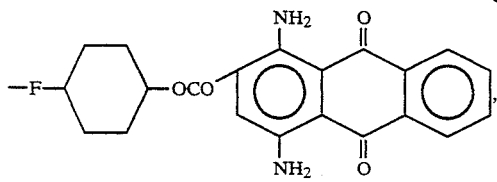

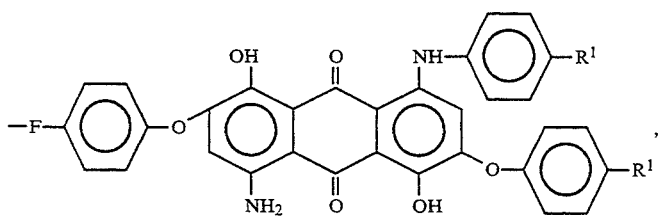

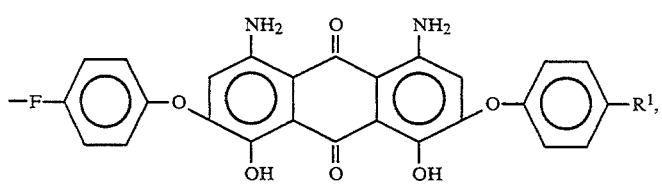

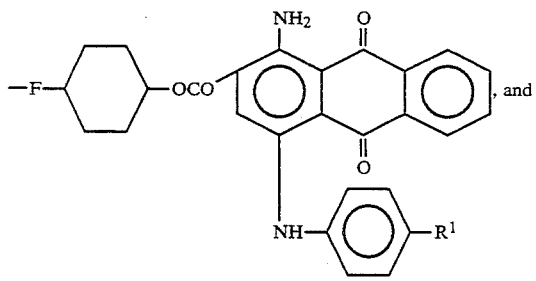

, and

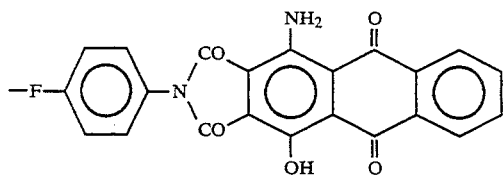

wherein F is a Linear or branched alkylene group having 1 to 12 carbon atoms and may optionally contain —O—, —COO— or —OCO— in the chain, and $R^1$ is an alkyl group having 1 to 8 carbon atoms, letters a, b, and c are numbers in the range: $1 \leq a < 2$, $0 < b+c \leq 1$, $0.45 \leq b(b+c) \leq 0.95$, and $1 \leq a+b+c \leq 3$.

13. The liquid crystal composition according to claim 12, wherein $1.8 \leq a+b+c \leq 2.2$.

14. The liquid crystal composition according to claim 12, wherein A is selected from the group consisting of

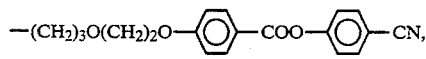

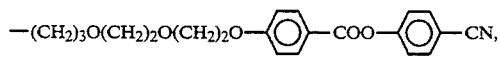

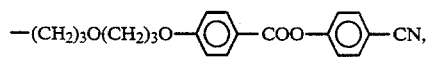

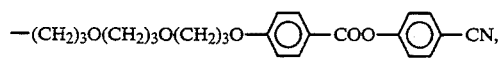

-continued

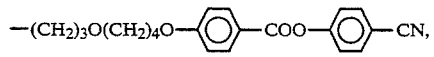

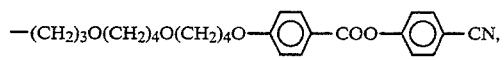

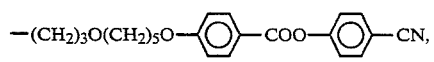

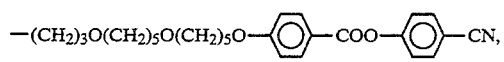

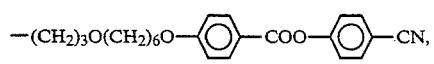

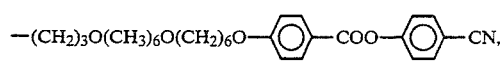

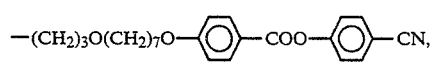

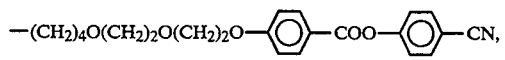

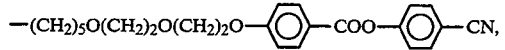

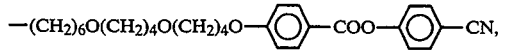

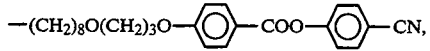

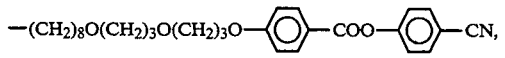

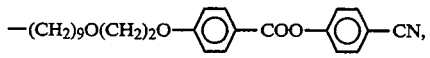

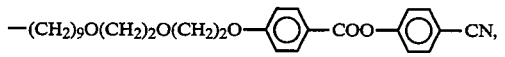

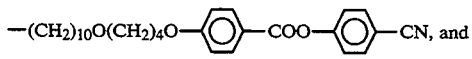

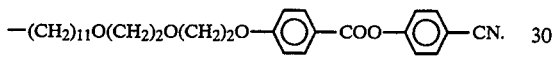

15. The liquid crystal composition of claim 12, which further comprises a low molecular weight liquid crystal.

16. The liquid crystal composition according to claim 12, wherein B is selected from the group consisting of

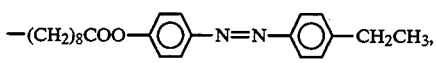

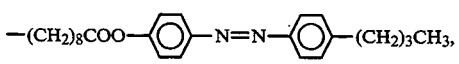

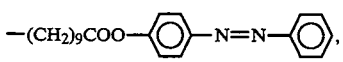

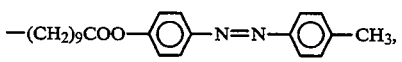

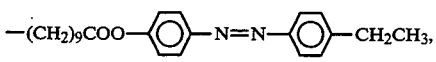

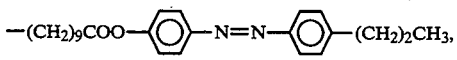

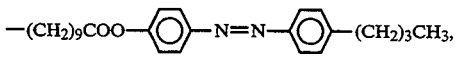

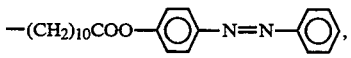

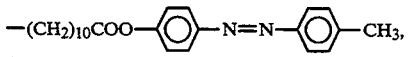

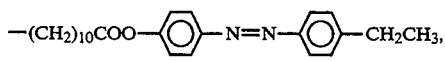

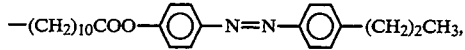

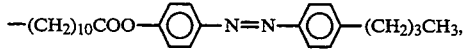

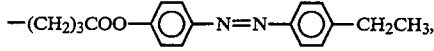

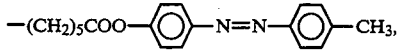

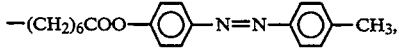

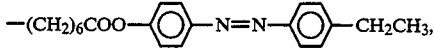

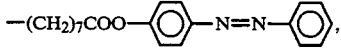

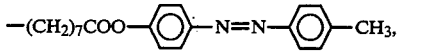

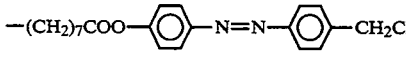

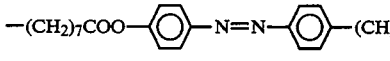

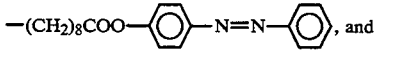

17. The liquid crystal composition of claim 15 which comprises 35 to 80 parts by weight of the high molecular weight liquid crystal and 65 to 20 parts by weight of the low molecular weight liquid crystal.

18. The liquid crystal composition of claim 15 which further comprises 0.3 to 10 parts by weight of a dichroic dye per 100 parts by weight of the total liquid crystals.

19. The liquid crystal composition of claim 15 which further comprises 0.01 to 0.5% by weight of an organic electrolyte material based on the total weight of the high and low molecular weight liquid crystals.

20. The liquid crystal composition of claim 19 wherein the organic electrolyte material is a quartenary ammonium salt.

21. The liquid crystal composition of claim 15 wherein the low molecular weight liquid crystal is a nematic liquid crystal.

22. The liquid crystal composition according to claim 18, wherein said dichroic dye is selected from the group consisting of

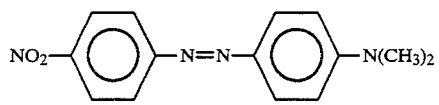
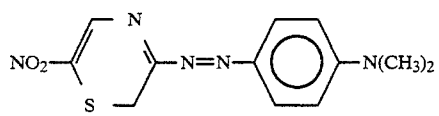
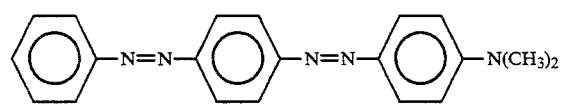
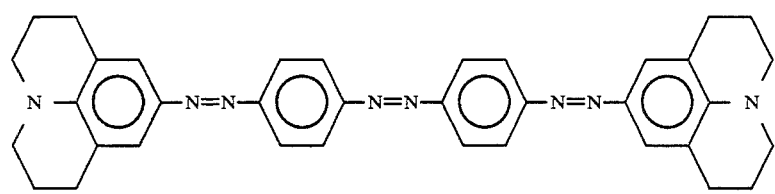
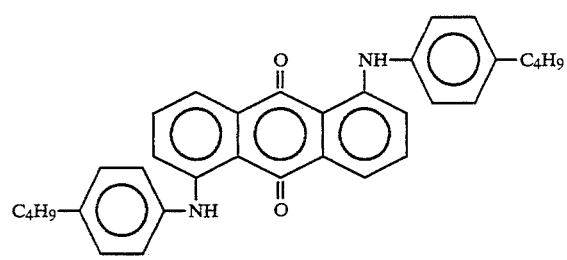
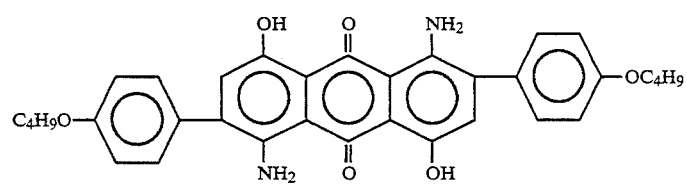
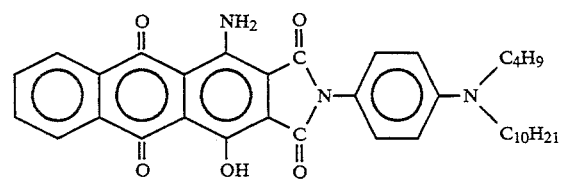
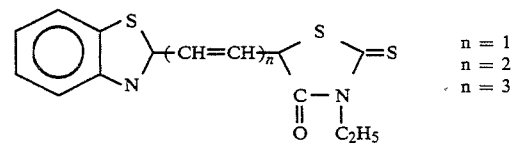
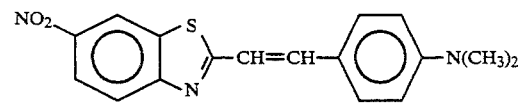
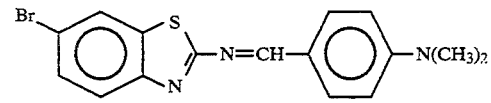

-continued

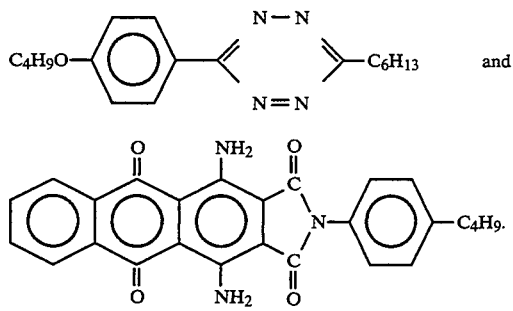

23. The liquid crystal composition according to claim 15, which comprises 65 to 45 parts by weight of said high molecular weight liquid crystal and 35 to 55 parts by weight of said low molecular weight liquid crystal.

24. The liquid crystal composition according to claim 15, which further comprises 0.5 to 5.0 parts by weight of a dichroic dye per 100 parts by weight of the total liquid crystals.

25. The liquid crystal composition according to claim 15, which further comprises 0.5 to 2.5 parts by weight of a dichroic dye per 100 parts by weight of the total liquid crystals.

* * * * *